US012035205B2

(12) United States Patent
Li et al.

(10) Patent No.: US 12,035,205 B2
(45) Date of Patent: Jul. 9, 2024

(54) MULTICAST AND BROADCAST SERVICES IN 5G NETWORKS FOR IOT APPLICATIONS

(71) Applicant: InterDigital Patent Holdings, Inc., Wilmington, DE (US)

(72) Inventors: Hongkun Li, Malvern, PA (US); Michael F. Starsinic, Newtown, PA (US); Catalina Mihaela Mladin, Hatboro, PA (US); Rocco Di Girolamo, Laval (CA); Qing Li, Princeton Junction, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/321,319

(22) Filed: May 22, 2023

(65) Prior Publication Data
US 2023/0379669 A1    Nov. 23, 2023

Related U.S. Application Data

(63) Continuation of application No. 16/957,997, filed as application No. PCT/US2019/012153 on Jan. 3, 2019, now Pat. No. 11,700,508.
(Continued)

(51) Int. Cl.
*H04W 72/04*    (2023.01)
*H04L 12/18*    (2006.01)
(Continued)

(52) U.S. Cl.
CPC ............. *H04W 4/06* (2013.01); *H04W 72/30* (2023.01); *H04W 76/10* (2018.02); *H04L 12/189* (2013.01)

(58) Field of Classification Search
CPC ............. H04W 72/0493; H04W 64/00; H04W 72/042; H04W 72/0453; H04W 4/029;
(Continued)

(56) References Cited

U.S. PATENT DOCUMENTS

| 6,223,045 B1 | 4/2001 | Valentine et al. |
| 6,594,493 B1 | 7/2003 | Davies et al. |

(Continued)

FOREIGN PATENT DOCUMENTS

| CN | 101155046 A | 4/2008 |
| CN | 101507303 A | 8/2009 |

(Continued)

OTHER PUBLICATIONS

"3rd Generation Partnership Project; Technical Specification Group Radio Access Network; UTRAN Iu interface Radio Access Network Application Part (RANAP) signalling (Release 8)", 3GPP TS 25.413 V8.5.0, Mar. 2010, pp. 1-398.
(Continued)

Primary Examiner — Joshua L Schwartz
(74) Attorney, Agent, or Firm — Flaster Greenberg P.C.

(57) ABSTRACT

A network entity, such as a user equipment (UE), may request that a network provide multicast and broadcast services, e.g., where the request includes entity preferences such as network slice selection information. The network may provide information regarding provision of such services, where the information may include, for example, whether a service will be provided via a user plane or a control plane connection, network slice information, additional connections to be formed, separate encryption for such connections, etc. A Multicast/Broadcast Network Function (MBNF) may be used to establish such connections and manage a broadcast and multicast sessions. The MBNF may, for example, manage groups of entities, check an entity's
(Continued)

access privileges for services, communicate with a Management and Network Orchestration (MANO) system to reserve resources, and send data to entities over a shared control plane connection.

20 Claims, 33 Drawing Sheets

Related U.S. Application Data

(60) Provisional application No. 62/741,792, filed on Oct. 5, 2018, provisional application No. 62/613,119, filed on Jan. 3, 2018.

(51) Int. Cl.
*H04W 4/06* (2009.01)
*H04W 64/00* (2009.01)
*H04W 72/00* (2023.01)
*H04W 72/30* (2023.01)
*H04W 76/10* (2018.01)

(58) Field of Classification Search
CPC .... H04W 24/08; H04B 7/0626; H04L 5/0023; H04L 5/0057
See application file for complete search history.

(56) References Cited

U.S. PATENT DOCUMENTS

| | | | |
|---|---|---|---|
| 7,633,926 | B1 | 12/2009 | Sethi et al. |
| 10,045,191 | B2 | 8/2018 | Nguyen et al. |
| 11,082,109 | B2 | 8/2021 | Martinez et al. |
| 2003/0157949 | A1 | 8/2003 | Sarkkinen et al. |
| 2004/0073928 | A1 | 4/2004 | Alakoski et al. |
| 2004/0087319 | A1 | 5/2004 | Bos et al. |
| 2010/0265867 | A1 | 10/2010 | Becker et al. |
| 2012/0026929 | A1 | 2/2012 | Wang et al. |
| 2012/0269111 | A1 | 10/2012 | Um et al. |
| 2012/0282956 | A1 | 11/2012 | Kim et al. |
| 2013/0128768 | A1 | 5/2013 | Balasubramanian et al. |
| 2015/0249542 | A1 | 9/2015 | Xu |
| 2017/0238149 | A1 | 8/2017 | Xu et al. |
| 2017/0332421 | A1 | 11/2017 | Sternberg et al. |
| 2018/0198867 | A1 | 7/2018 | Dao et al. |
| 2019/0306023 | A1 | 10/2019 | Vasseur et al. |

FOREIGN PATENT DOCUMENTS

| | | |
|---|---|---|
| CN | 101616363 A | 12/2009 |
| CN | 102457808 A | 5/2012 |
| CN | 102668461 A | 9/2012 |
| CN | 103098533 A | 5/2013 |
| CN | 105247813 A | 1/2016 |
| IN | 101884230 A | 11/2010 |
| WO | 2016/161242 A1 | 10/2016 |

OTHER PUBLICATIONS

3rd Generation Partnership Project, "Technical Specification Group Core Network and Terminals Non-Access-Stratum (NAS) protocol for Evolved Packet System (EPS) Stage 3 (Release 8)," 3GPP TS 24.301, V8.0.0, Dec. 2008, pp. 1-181.
3rd Generation Partnership Project, "Technical Specification Group Services and System Aspects Multimedia Broadcast/Multicast Service (MBMS) Architecture and functional description (Release 14)," 3GPP TS 23.246, V14.2.0, Sep. 2017, pp. 1-76.
3rd Generation Partnership Project, "Technical Specification Group Services and System Aspects Procedures for the 5G System Stage 2 (Release 15)," 3GPP TS 23.502, V0.5.0, Jul. 2017, pp. 1-148.
3rd Generation Partnership Project, "Technical Specification Group Services and System Aspects 5G enhanced Mobile Broadband, Media Distribution (Release 15)", Nov. 17, 2017.
3rd Generation Partnership Project,"Technical Specification Group Services and System Aspects; Multimedia Broadcast/ Multicast Service (MBMS); Architecture and functional description (Release 15)", 3GPP TS 23.246, V15.0.0, Dec. 2017, pp. 1-77.
Cain et al., "Internet Group Management Protocol, Version 3", Network Working Group, Request for Comments: 3376, Obsoletes: 2236, Category: Standards Track, Oct. 2002, pp. 1-53.
3rd Generation Partnership Project, "Technical Specification Group Services and System Aspects; General Packet Radio Service (GPRS) enhancements for Evolved Universal Terrestrial Radio Access Network (E-UTRAN) access, Release 13", 3GPP TS 23.401, V13.0.0, Sep. 2014.
3rd Generation Partnership Project, "Technical Specification Group Services and System Aspects; Architecture enhancements to facilitate communications with packet data networks and applications", 3GPP TS 23.682, V15.1.0, Jun. 2017.
ETSI, "Network Functions Virtualization (NFV); Architectural Framework", ETSI GS NFV 002 V1.1.1, Oct. 2013.
NGMN Alliance, "Description of Network Slicing Concept", 160113, V1.0., Jan. 2016.
OneM2M-TS-0001 oneM2M Functional Architecture—V2.5.0.
3rd Generation Partnership Project, "Technical Specification Group Services and System Aspects; System Architecture for the 5G System; Stage 2 (Release 15)", 3GPP TS 23.501 V1.2.0, Jul. 2017.
3rd Generation Partnership Project, "Technical Specification Group Core Network and Terminals; Technical realization of Cell Broadcast Service (CBS) (Release 14)", 3GPP TS 23.041, V14.1.0, Jun. 2016.
3rd Generation Partnership Project, Study on Architecture for Next Generation System (Release 14), SP-160667, 3GPP TSG SA Meeting #73, V 1.0.0, Sep. 2016.
3rd Generation Partnership Project, "Technical Specification Group Radio Access Network; UTRAN Iu interface Radio Access Network Application Part (RANAP) signalling (Release 8)", 3GPP TS 25.413 V8.5.0, Mar. 2010, 408 pages.
3rd Generation Partnership Project, "Technical Specification Group Services and System Aspects; Study on architecture enhancements to support Group Communication System Enablers for LTE (GCSE_LTE) (Release 12)", 3GPP TR 23.768 V12.1.0, Jun. 2014, 63 pages.

MULTICAST AND BROADCAST SERVICES IN 5G NETWORKS FOR IOT APPLICATIONS

CROSS-REFERENCE TO RELATED APPLICATIONS

This application is a continuation of U.S. patent application Ser. No. 16/957,997 filed Jun. 25, 2020 which is the National Stage Application of International Patent Application No. PCT/US2019/012153 filed Jan. 3, 2019, which claims the benefit of U.S. Provisional Application No. 62/613,119, filed on Jan. 3, 2018, entitled "Multicast and Broadcast Services in 5G Networks for IOT Applications," and U.S. Provisional Application No. 62/741,792, filed on Oct. 5, 2018, entitled "Multicast and Broadcast Services in 5G Networks for IOT Applications," the contents of which are hereby incorporated by reference in their entirety.

BACKGROUND

Machine-To-Machine (M2M), Internet-of-Things (IoT), and Web-of-Things (WoT) network deployments may employ unicast and multicast communications between nodes such as M2M/IoT/WoT servers, gateways, and devices which host M2M/IoT/WoT applications and services. Such network deployments may include, for example, constrained networks, wireless sensor networks, wireless mesh networks, mobile ad-hoc networks, and wireless sensor and actuator networks. Networks of these kinds include, for example, 3GPP Mobile Core Network (MCN), 4G LTE EPC, 5G NextGen, as described by such standards as 3GPP SA2.

SUMMARY

A network entity, such as a user equipment (UE), may request that a network provide multicast and broadcast services. Such a request may include, for example, entity preferences such as, but not limited to: Network Slice Selection Assistance information (S-NSSAI); information elements supporting UE broadcast/multicast via a Local Area Data Network (LADN); network buffering of the broadcast/multicast data, e.g., for support of UE sleep modes; and parameters regarding periodic multicasts and broadcasts.

The network may provide information regarding provision of such services, where the information may include, for example: whether a service will be provided via a user plane or a control plane connection; network slice information; additional connections to be formed; separate encryption for such connections, etc.

A Multicast/Broadcast Network Function (MBNF) may be used to establish such connections and manage broadcast and multicast sessions. The MBNF may, for example: manage groups of entities; communicate with entities regarding establishing connections; check an entity's access privileges for services; communicate with a Management and Network Orchestration (MANO) system to reserve resources; send data to entities over a shared control plane connection; and manage periodic multicasts and broadcasts.

During a registration process, a UE may indicate that it is interested in one or more types of application broadcasts, and would like to receive the application data which is delivered by group communication, broadcast, or multicast through the core network. If there are multiple application servers that provides the type of requested data, the core network may select one for the UE.

An application server may request to form a group for an application during a registration process.

An update to an existing connection for group communication initiated by an application server or application function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

A more detailed understanding may be had from the following description, given by way of example in conjunction with the accompanying drawings.

DETAILED DESCRIPTION

A next generation network, such as the 5G core network (5GC), and entities connected to such a network, may be enhanced to permit multicast and broadcast operations over both the control plane and the user plane. Similar enhancements may be made to an Evolved Packet Core to support broadcasting and multicasting of data over the control plane.

Many IoT applications require frequent data transfer between the IoT servers and IoT devices, such as sensors. In many cases, an IoT server/gateway may send the same message/command to a large group of IoT devices registered with it. For example, in a power plant, an IoT server may want to send the same request to a group of sensors, which are monitoring temperature and pressure changes. The message may indicate that all devices need to change their reporting period because some unusual readings were reported. Another example is that an IoT server broadcasts messages to environmental sensors over a large area, such as a national park. The messages would bring calibration information which may be location dependent.

Figure 1:
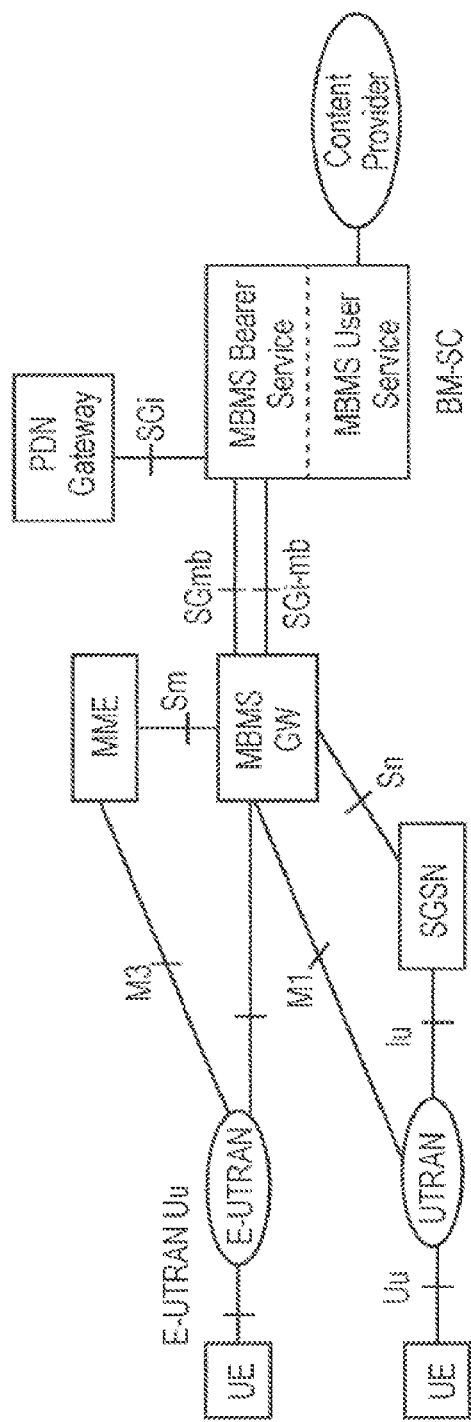
FIG. 1 shows an example MBMS architecture for EPS with E-UTRAN and UTRAN.
Figure 5:
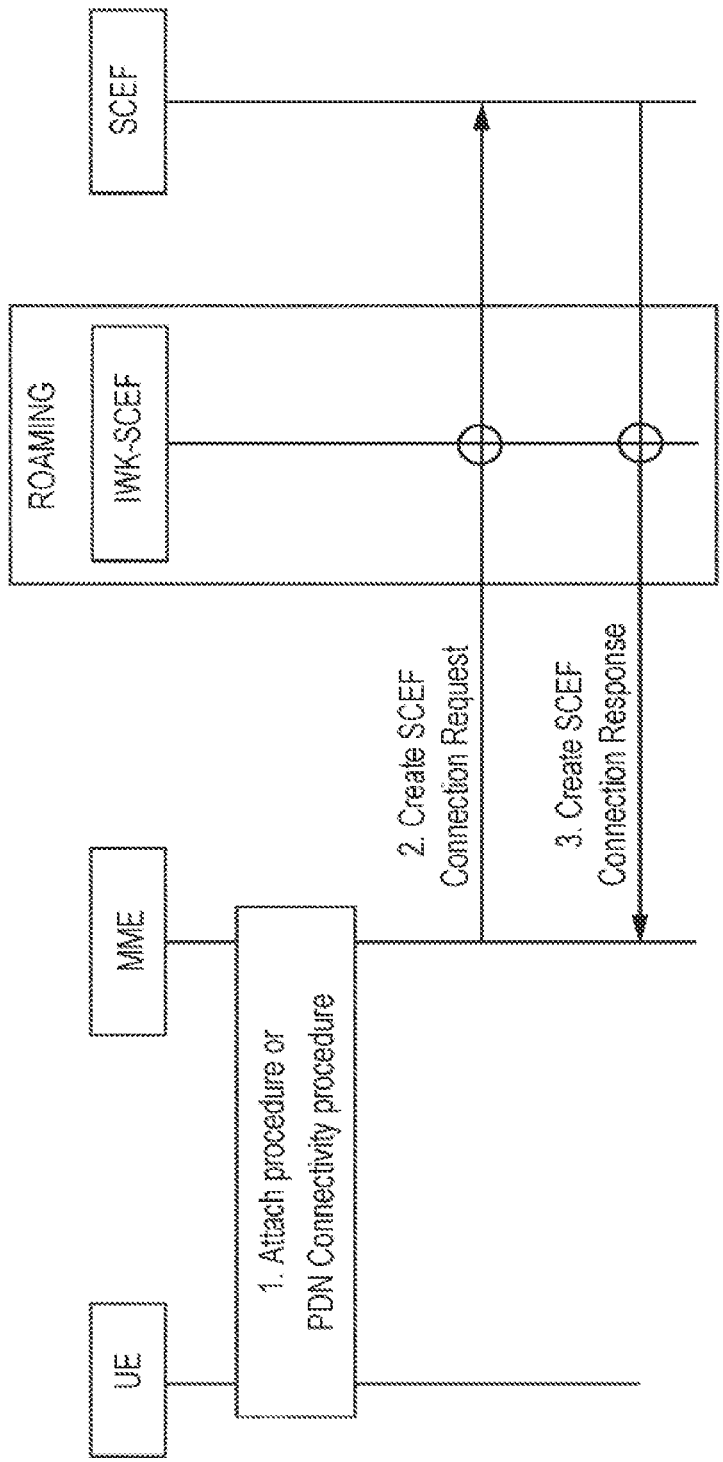
FIG. 5 shows a call flow for an example T6a connection establishment procedure.
Figure 6:
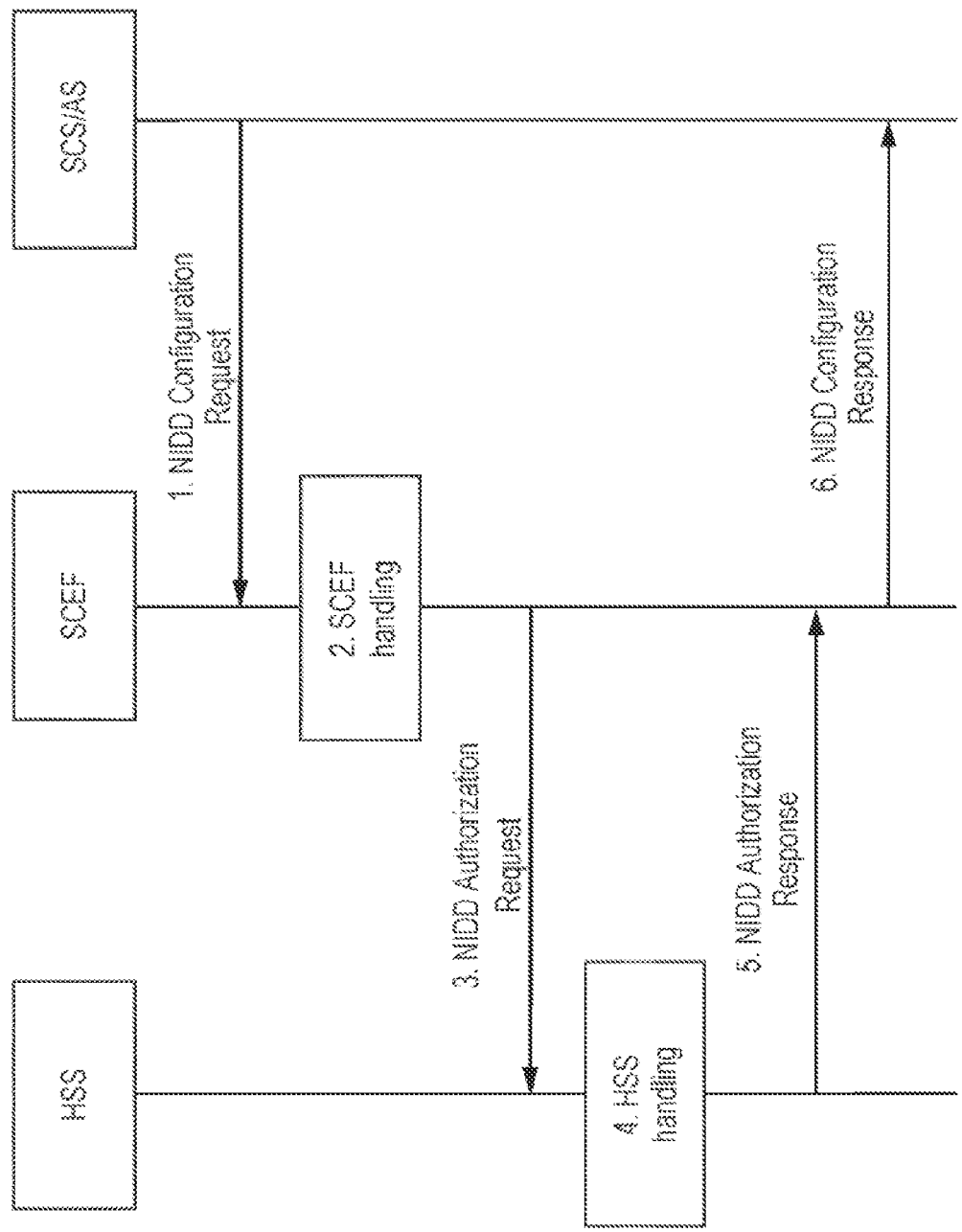
FIG. 6 shows a call flow for an example configuration for non-IP data delivery procedure.

In LTE EPS, only broadcast is supported by the MBMS framework of FIG. 1, where a BM-SC is defined to manage the control signaling for the broadcast/multicast, and a MBMS GW is defined as the anchor point to transfer the data toward the UEs. However, it might not be efficient for NB-IoT devices to support MBMS. In some deployments, it may be desirable for NB-IoT devices to support only an S1-MME interface to the network and no S1-U interface. For example, methods of transferring data via the control plane are shown in FIG. 5 and FIG. 6. Thus, the NB-IoT device would only receive data via the control plane. Thus, a control plane, NAS, broadcasting mechanism is desirable but none exists.

Eventually, operators will want to connect NB-IoT devices to the 5G core network (5GC). This would be advantageous if the operator is providing service to many 5G and NB-IoT devices. Thus, a mechanism to broadcast data over the control plane is also needed in the 5GC, but none exist. In fact, no broadcast mechanisms have been defined for the 5GC.

Moreover, given the wide range of applications (e.g., massive IoT, mission critical communication, Vehicle-to-Everything (V2X), local data network and small non-frequent data transfer over the control plane) that will be supported in 5G, there is a need to define new mechanisms and methods for enabling broadcast/multicast capability in 5G network.

A network entity, such as a user equipment (UE), may request that a network provide multicast and broadcast services. Such a request may include, for example, entity preferences such as, but not limited to: Network Slice Selection Assistance information (S-NSSAI); information elements supporting; UE broadcast/multicast via a Local Area Data Network (LADN); network buffering of the broadcast/multicast data, e.g., for support of UE sleep modes; and parameters regarding periodic multicasts and broadcasts.

The network may provide information regarding provision of such services, where the information may include, for example, whether a service will be provided via a user plane or a control plane connection, network slice information, additional connections to be formed, separate encryption for such connections, etc.

A service provider, such as an, SCS/AS, may also request the establishment of connections for the broadcast/multicast services to be provided by a 5G network to deliver its application data.

A Multicast/Broadcast Network Function (MBNF) may be used to establish such connections and manage broadcast and multicast sessions. The MBNF may, for example: manage groups of entities; communicate with entities regarding establishing connections; check an entity's access privileges for services; communicate with a Management and Network Orchestration (MANO) system to reserve resources; send data to entities over a shared control plane connection; and manage periodic multicasts and broadcasts.

Similar methods may be employed for establishing the connection of broadcast/multicast resources to transfer the mobile terminated (MT) data to UEs via control plane and via user plane, and transferring the MT data to UEs through such a broadcast/multicast mechanism. For example, MT date may be broadcast/multicast via control plane for 4G LTE EPC.

TABLE 1

| | Abbreviations |
|---|---|
| AMF | Access and Mobility Management Function |
| AS | Application Server |
| BM-SC | Broadcast-Multicast Service Center |
| CM | Connection Management |
| CN | Core Network |
| CP | Control Plane |
| DL | Downlink |
| EPC | Evolved Packet Core |
| EPS | Evolved Packet System |
| E-UTRAN | Evolved Universal Terrestrial Access Network |
| HSS | Home Subscriber Server |
| IMSI | International Mobile Subscriber Identity |
| LADN | Local Area Data Network |
| LTE | Long Term Evolution |
| MANO | Management and Network Orchestration |
| MBMS | Multimedia Broadcast/Multicast Service |
| MBNF | Multicast/Broadcast Network Function |
| MME | Mobility Management Entity |
| NAS | Non Access Stratum |
| NEF | Network Exposure Function |
| NF | Network Function |
| NIDD | Non-IP Data Delivery |
| NRF | NF Repository Function |
| OTT | Over-the-Top |
| PCF | Policy Control Function |
| PDN | Packet Data Network |
| PDU | Packet Data Unit |
| P-GW | PDN Gateway |
| PWS | Public Warning Service |
| RAN | Radio Access Network |
| RAT | Radio Access Technology |
| SCS | Service Capability Server |
| SCEF | Service Capability Exposure Function |
| SD | Slice Differentiator |
| S-GW | Serving Gateway |
| SMF | Session Management Function |
| SMSF | Short Message Service Function |
| S-NSSAI | Single Network Slice Selection Assistance information |
| SST | Slice/Service Type |

TABLE 1-continued

Abbreviations

| | |
|---|---|
| TMGI | Temporary Mobile Group Identity |
| UDM | Unified Data Management |
| UE | User Equipment |
| UL | Uplink |
| UPF | User Plane Function |

Herein, the term "Network Function" (NF) generally refers to a processing function in a network, which has defined functional behavior and defined interfaces. An NF can be implemented either as a network element on a dedicated hardware, or as a software instance running on a dedicated hardware, or as a virtualized function instantiated on an appropriate platform, e.g., on a cloud infrastructure.

Herein, the term "PDU session" generally refers to an association between the UE and a data network that provides a PDU Connectivity Service. Two types of PDU sessions are defined: IP type—where the data network is IP type; and non-IP type—data network is non-IP.

Herein, the term "session management in 3GPP CN" generally refers to, in 3GPP CN, session management is to manage the end-to-end PDN connection (IP or non-IP type) between UE and packet data network for the data transfer through the core network with policy (e.g., QoS) and charging control enforced.

Herein, the term "network slice" generally refers to a logical network that provides specific network capabilities and network characteristics.

Herein, the term "network slice instance" generally refers to a set of Network Function instances and the required resources (e.g., computing, storage, and networking resources) which form a deployed network slice. An S-NSSAI (Single Network Slice Selection Assistance information) identifies a network slice, and is comprised of: a Slice/Service Type (SST), which refers to the expected network slice behavior in terms of features and services; a Slice Differentiator (SD), which is optional information that complements the Slice/Service Type(s) to differentiate amongst multiple network slices of the same Slice/Service Type.

Note that the terms multicast and broadcast are used interchangeably in this document. Both terms are used to describe sending the same message to more than one recipient.

The term "RAN node" is used herein to refer to a functionality in the RAN that terminates an N2 or N3 reference point.

The term "procedure" generally refers to methods of performing operations to achieve particular ends. Herein the term "procedure" is often used in place of "method" to avoid confusion with special meanings of the term "method" in the context of M2M and IoT applications. The steps described for procedures are often optional, and potentially may be performed in a variety of ways and a variety of sequences. Hence, herein the term "procedure" should not be interpreted as referring to a rigid set and sequence of steps, but rather to a general methodology for achieving results that may be adapted in a variety of ways.

FIG. 1 illustrates an architecture for EPS with E-UTRAN and UTRAN in Multimedia Broadcast/Multicast Service (MBMS) Broadcast Mode only, e.g., per 3GPP TS 23.246 Multimedia Broadcast/Multicast Service (MBMS), Architecture and Functional Description.

MBMS is a point-to-multipoint service in which data is transmitted from a single source entity to multiple recipients. Transmitting the same data to multiple recipients allows network resources to be shared. MBMS architecture enables the efficient usage of radio-network and core-network resources, with an emphasis on radio interface efficiency. The MBMS bearer service offers two modes: Broadcast Mode and Multicast Mode. EPS supports only Broadcast Mode.

The Broadcast-Multicast Service Center (BM-SC) provides functions for MBMS user service provisioning and delivery. It may serve as an entry point for content provider MBMS transmissions, used to authorize and initiate MBMS Bearer Services within the PLMN and can be used to schedule and deliver MBMS transmissions. The BM-SC is a functional entity, which must exist for each MBMS User Service.

The MBMS control plane function may be supported by MME for E-UTRAN access, such as per 3GPP TS 23.246, via such mechanisms as session control of MBMS bearers to the E-UTRAN access (including reliable delivery of Session Start/Session Stop to E-UTRAN), and transmit Session control messages towards multiple E-UTRAN nodes.

Figure 2:
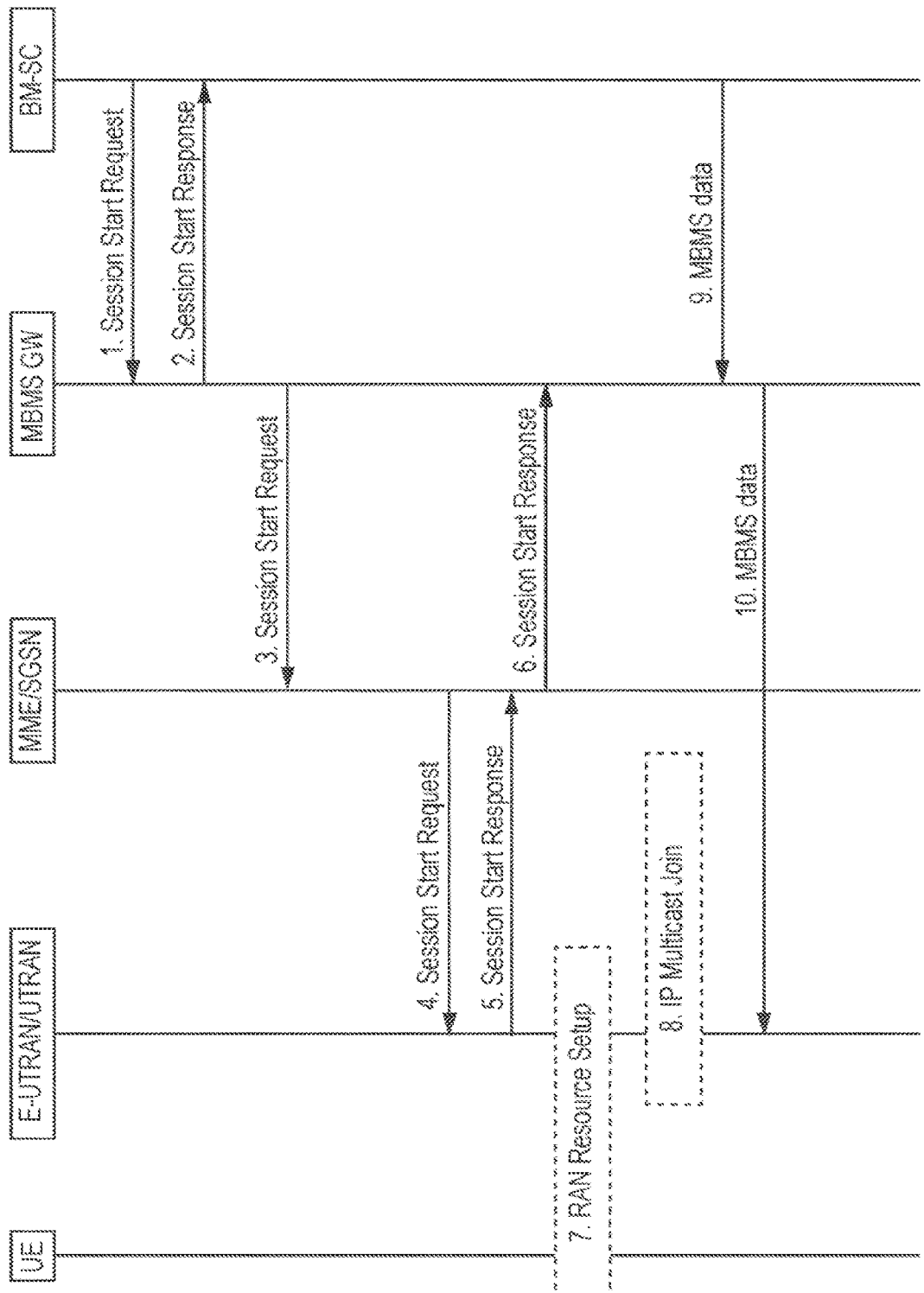
FIG. 2 shows a call flow for an example MBMS session start procedure for E-UTRAN and UTRAN for EPS.

FIG. 2 shows an example overall MBMS session start procedure for E-UTRAN and UTRAN for EPS. The BM-SC initiates the MBMS Session Start procedure when it is ready to send data. This is a request to activate all necessary bearer resources in the network for the transfer of MBMS data and to notify interested UEs of the imminent start of the transmission.

LTE EPC defines group message delivery to efficiently distribute the same content to the members of a group that are located in a particular geographical area on request of the SCS/AS via SCEF. An example procedure handling for group message delivery using MBMS is shown in FIG. 3.

Figure 3:
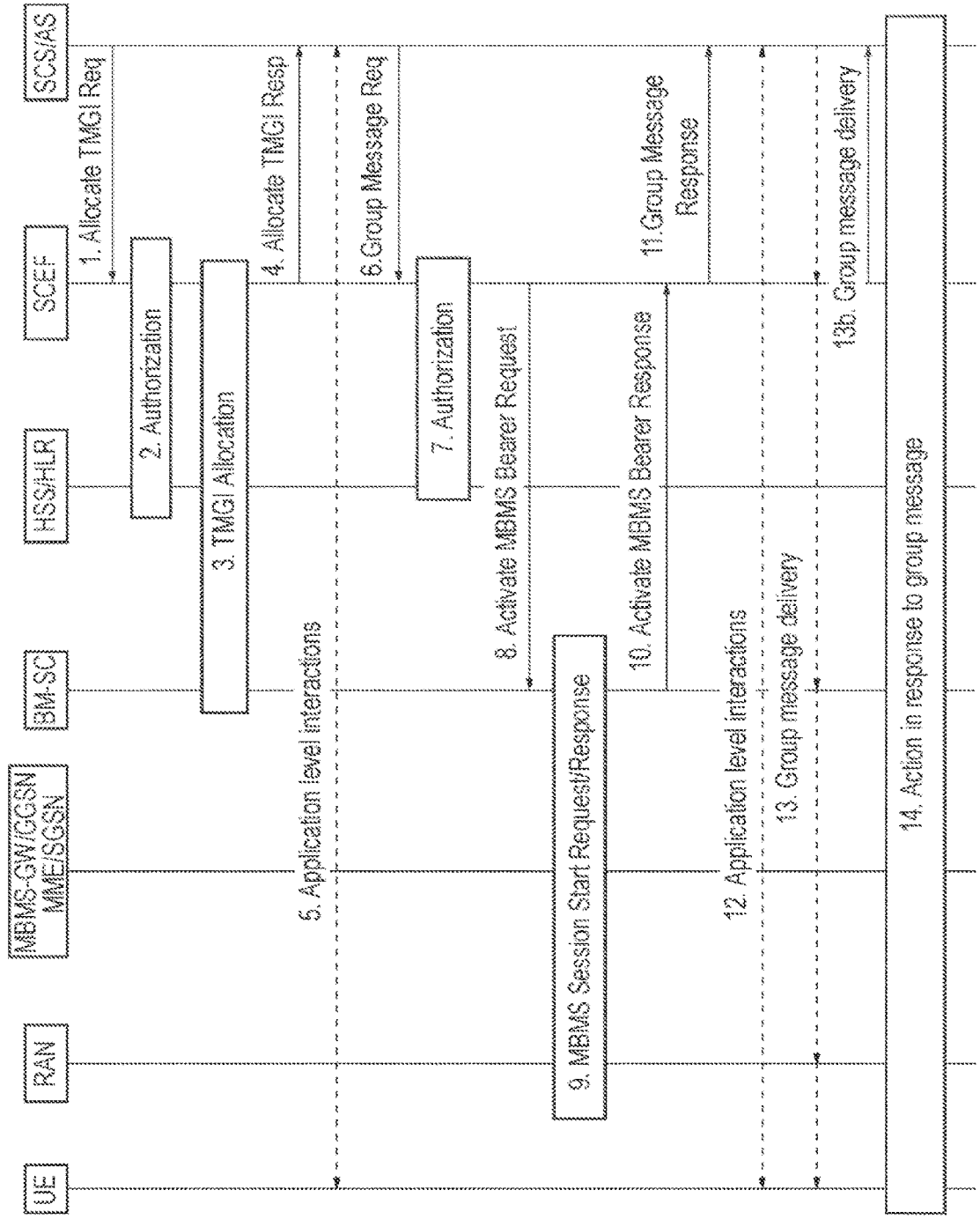
FIG. 3 show a call flow for an example group message delivery using MBMS.

In steps 1 to 4 of FIG. 3, an SCS/AS requests Temporary Mobile Group Identity (TMGI) allocation via SCEF, and BM-SC allocates the TMGI.

In steps 6 to 11, the SCS/AS requests to send some contents to one or more groups of UEs, and BM-SC sets up the MBMS bearer for the broadcast. Note, details of step 9 for MBMS session setup is shown in FIG. 2.

In step 12, application-level interactions may be applied for the devices of specific group to retrieve the related MBMS service information such as, e.g., TMGI and start time.

In steps 13a and 13b, the SCS/AS broadcasts the content to the targeted UEs via SCEF and BM-SC using the MBMS.

In step 14, in response to the received content, the UE may initiate immediate or later communication with the SCS/AS.

The group message delivery using MBMS has limited applicability and does not support all the scenarios, e.g., UEs not supporting MBMS and UEs located in areas where MBMS is not deployed.

Public Warning Service (PWS) provides a service that allows the network to distribute warning messages on behalf of public authority. PWS enables the distribution of ETWS, CMAS (aka WEA), KPAS and EU-Alert warning messages in GSM, UMTS and E-UTRAN. See, e.g., Public Warning Service (PWS) architecture in 3GPP TS 23.041, Technical realization of Cell Broadcast Service (CBS), v14.1.0, Release 14.

Some of the PWS warning message distribution mechanisms are access technology specific, but for GSM and UMTS there is also a common part using Cell Broadcast Service (CBS) procedures and related message structures, and for E-UTRAN CBS related message structures are used.

Figure 4:
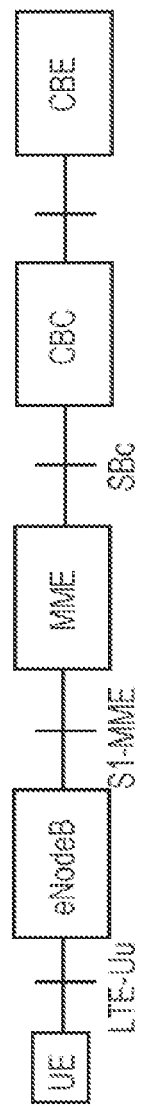
FIG. 4 shows an example Public Warning Service (PWS) architecture in EPS.

The basic network structure of PWS architecture in EPS is depicted by FIG. 4. The cell broadcast center (CBC) is part of the core network and connected to the MME via the SBc reference point. The interface between the CBC and the MME is described in 3GPP TS 29.168 and the interface between the MME and the eNB is described in 3GPP TS 36.413. The cell broadcast entity (CBE) and the interface between CBE and CBC are out of scope of 3GPP specifications.

The warning message to be broadcast is delivered via MMEs to multiple eNBs. The eNB(s) are responsible for scheduling the broadcast of the new message and the repetitions in each cell.

3GPP R13 defines control plane optimization for small data delivery for Cellular IoT. Specifically, control plane optimizations refer to sending user data over the control plane to the MME/SGSN in a NAS message. The advantage to using control plane optimizations to send data is that the total number of control plane messages that are required to send a short data transaction is reduced. There are 3 types of control plane data paths: IP data terminated at P-GW; non-IP data terminated at P-GW; and non-IP data terminated at SCEF.

FIG. 5 shows an example T6a connection establishment procedure between SCEF and MME, including the roaming scenario, e.g., per 3GPP TS 23.682. FIG. 6 illustrates an example procedure of configuring necessary information at the SCEF, and HSS, and MME for transferring non-IP data, e.g., per 3GPP TS 23.682. The procedure may also be used for replacing and deleting configuration information.

Figure 7:
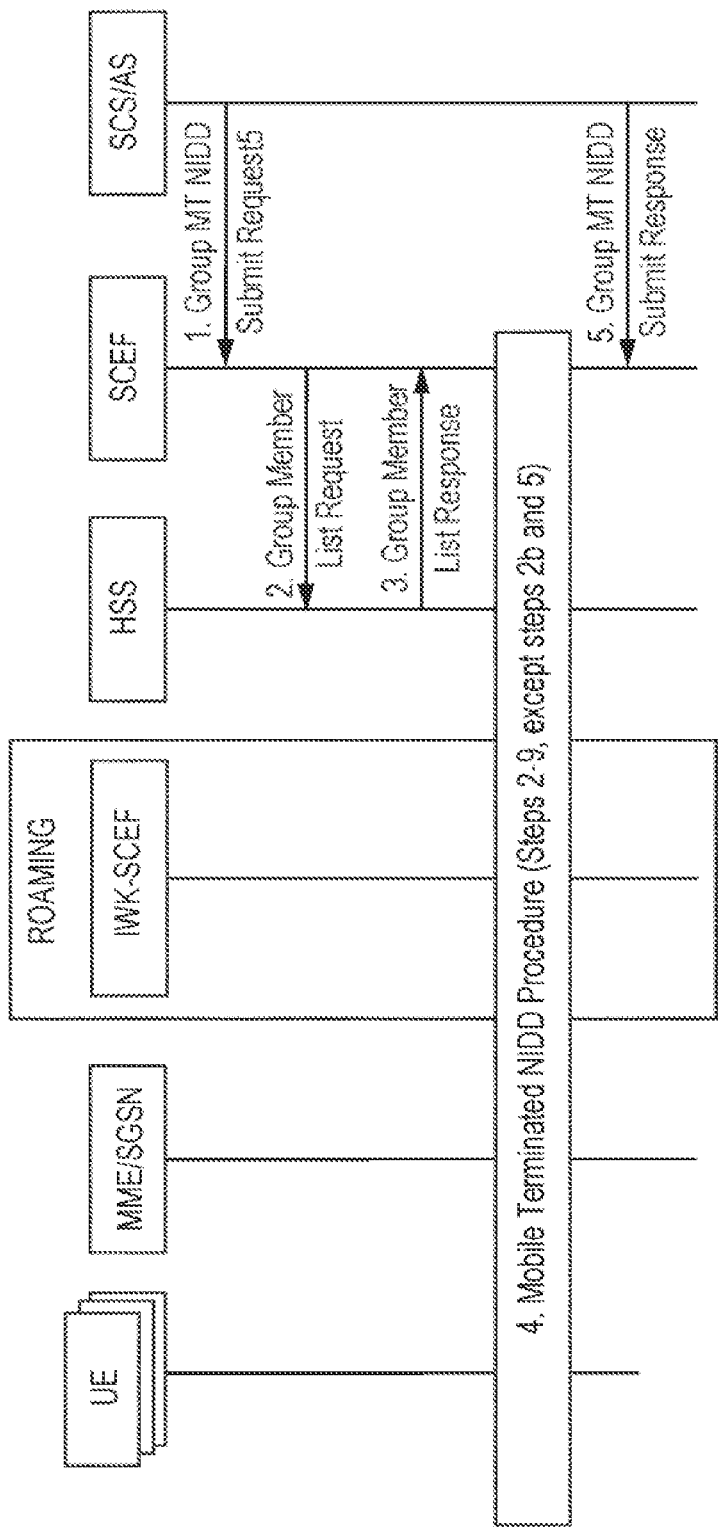
FIG. 7 shows a call flow for an example Group Message Delivery via unicast MT NIDD.

FIG. 7 shows an example call flow for group message delivery via unicast MT NIDD, e.g., based on the NIDD feature defined in R13, a group NIDD procedure is defined in 3GPP TS 23.682.

In step 1 of FIG. 7, if SCS/AS has downlink non-IP data to send to a group of UEs, the SCS/AS sends a Group MT NIDD Submit Request.

In step 2, the SCEF sends a Group Member List Request (External Group Identifier) to the HSS to request an External Identifier for each UE.

In step 3, the HSS checks that the SCEF is allowed to resolve the group and sends a Group Member List Response (External Identifier(s), cause) to provide the SCEF with the list of the individual member IDs that are associated with the External Group Identifier.

In step 4, the SCEF performs this step for each External Identifier that was provided to the SCEF in step 3. The SCEF determines the EPS Bearer Context based on the TLTRI that is associated with the SCS/AS Identifier and the External Identifier In step 5, after executing step 4 for each UE, the SCEF sends a single Group MT NIDD Submit Response.

Figure 8:
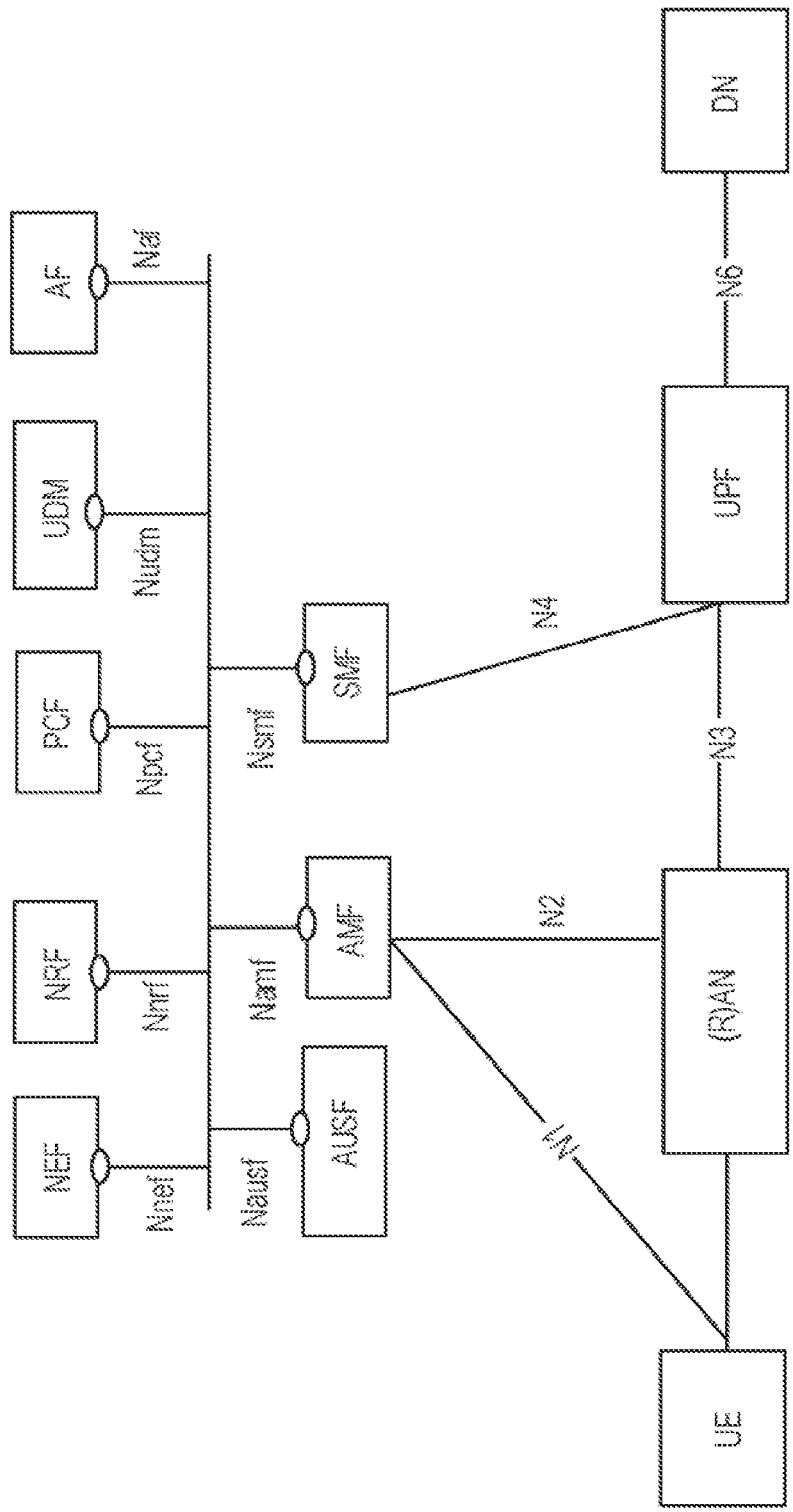
FIG. 8 shows an example 5G system service-based architecture.

FIG. 8 shows the non-roaming reference architecture with service-based interfaces within the Control Plane.

Figure 9:
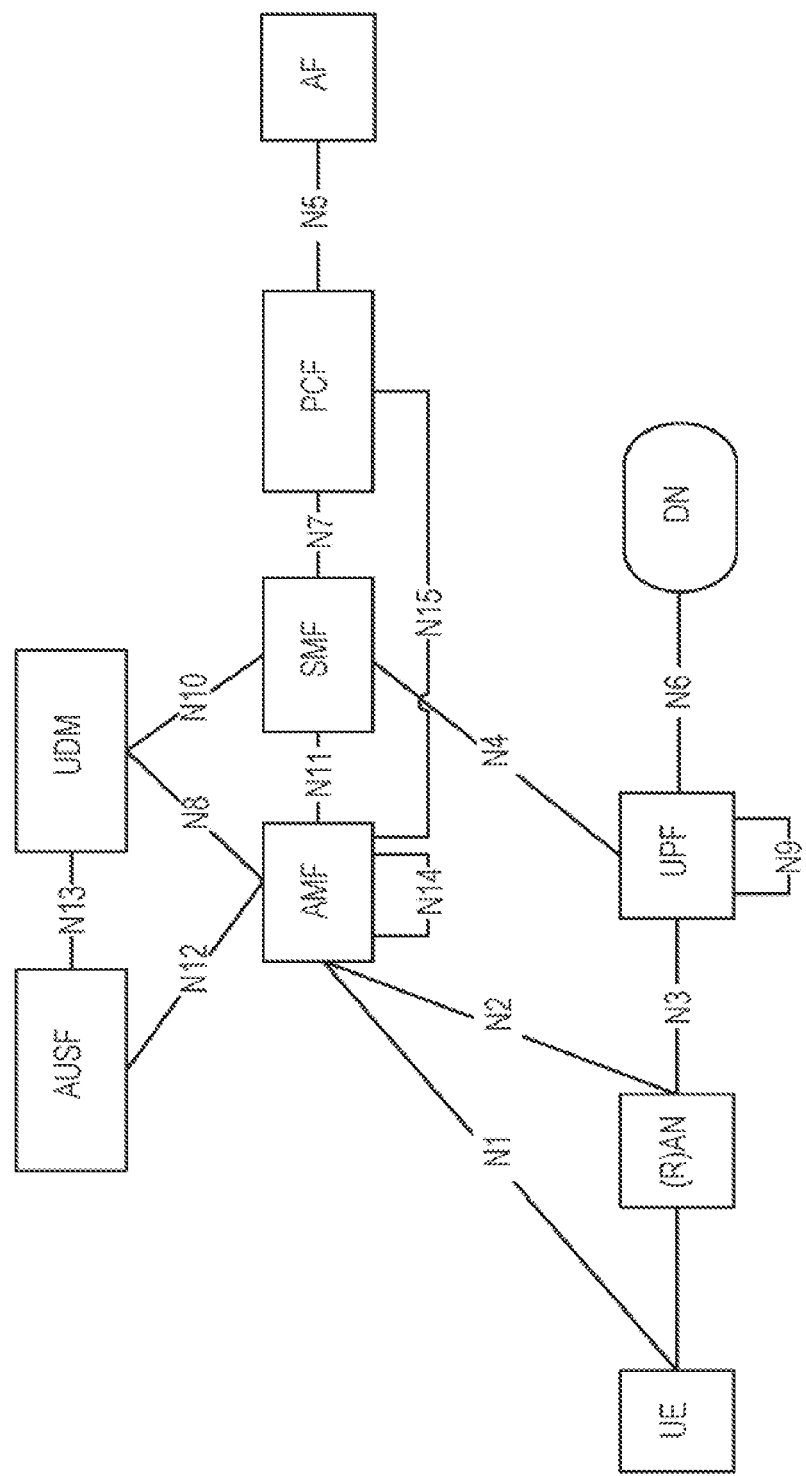
FIG. 9 shows an example non-roaming 5G system architecture in reference point representation.

FIG. 9 depicts the 5G System architecture in the non-roaming case, using the reference point representation showing how various network functions interact with each other. The mobility management and session management functions are separated. A single N1 NAS connection is used for both Registration Management and Connection Management (RM/CM) and for SM-related messages and procedures for a UE. The single N1 termination point is located in AMF. The AMF forwards SM related NAS information to the SMF. AMF handles the Registration Management and Connection Management part of NAS signaling exchanged with the UE. SMF handles the session management part of NAS signaling exchanged with the UE.

Figure 10:
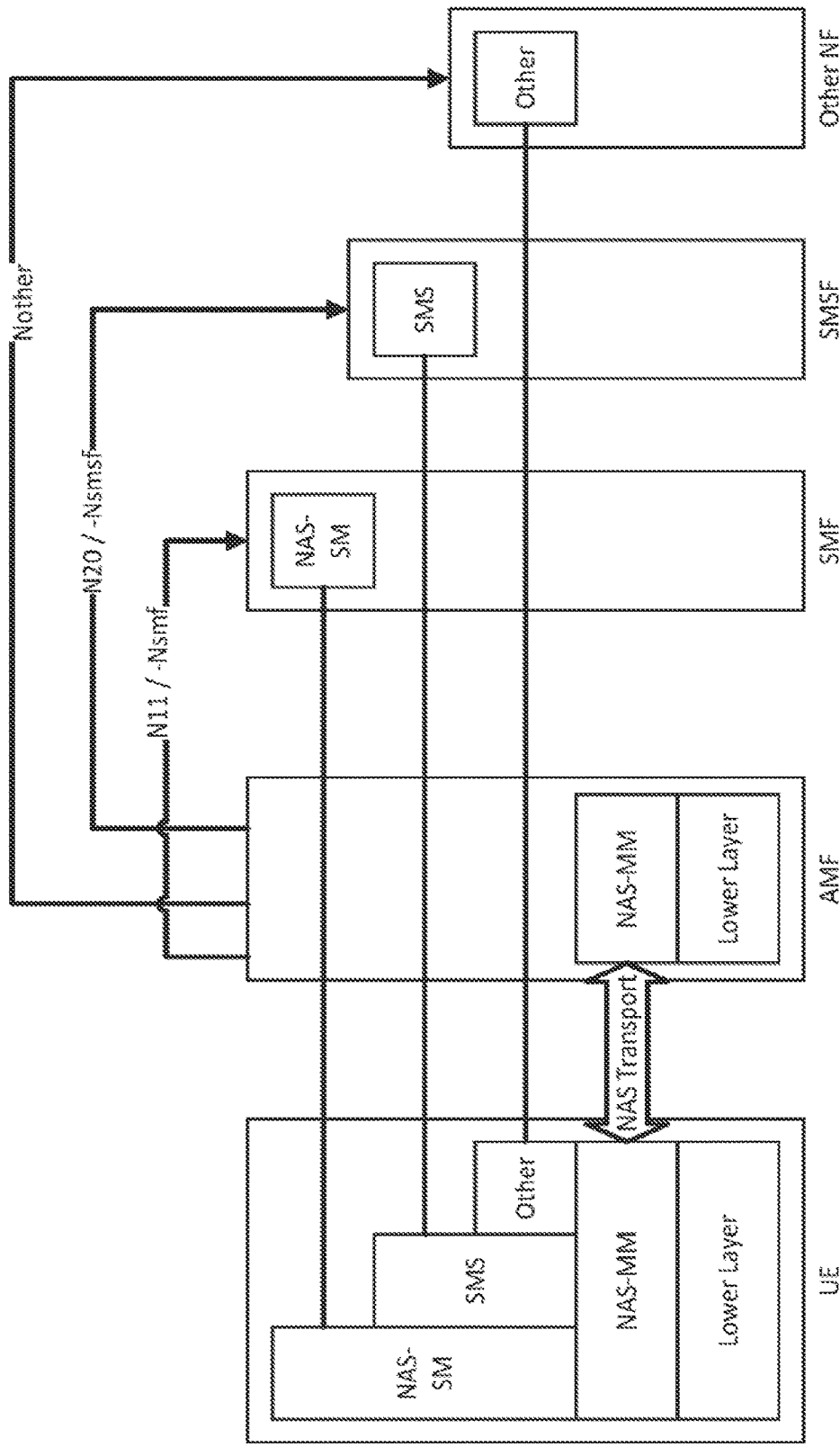
FIG. 10 shows an example of NAS transport for SM, SMS and other services.

A single N1 NAS connection may be used for each access to which the UE is connected. The single N1 termination point is located in AMF. The single N1 NAS connection is used for both Registration Management and Connection Management (RM/CM) and for SM-related messages and procedures for a UE. The NAS protocol over N1 consists of a NAS-MM and a NAS-SM component. FIG. 10 shows an example general protocol stack between UE and 5G core network over the N1 interface (e.g., between UE and AMF), e.g., per 3GPP TS 23.501, System Architecture for the 5G System; Stage 2, v1.2.0, Release 15.

Figure 11:
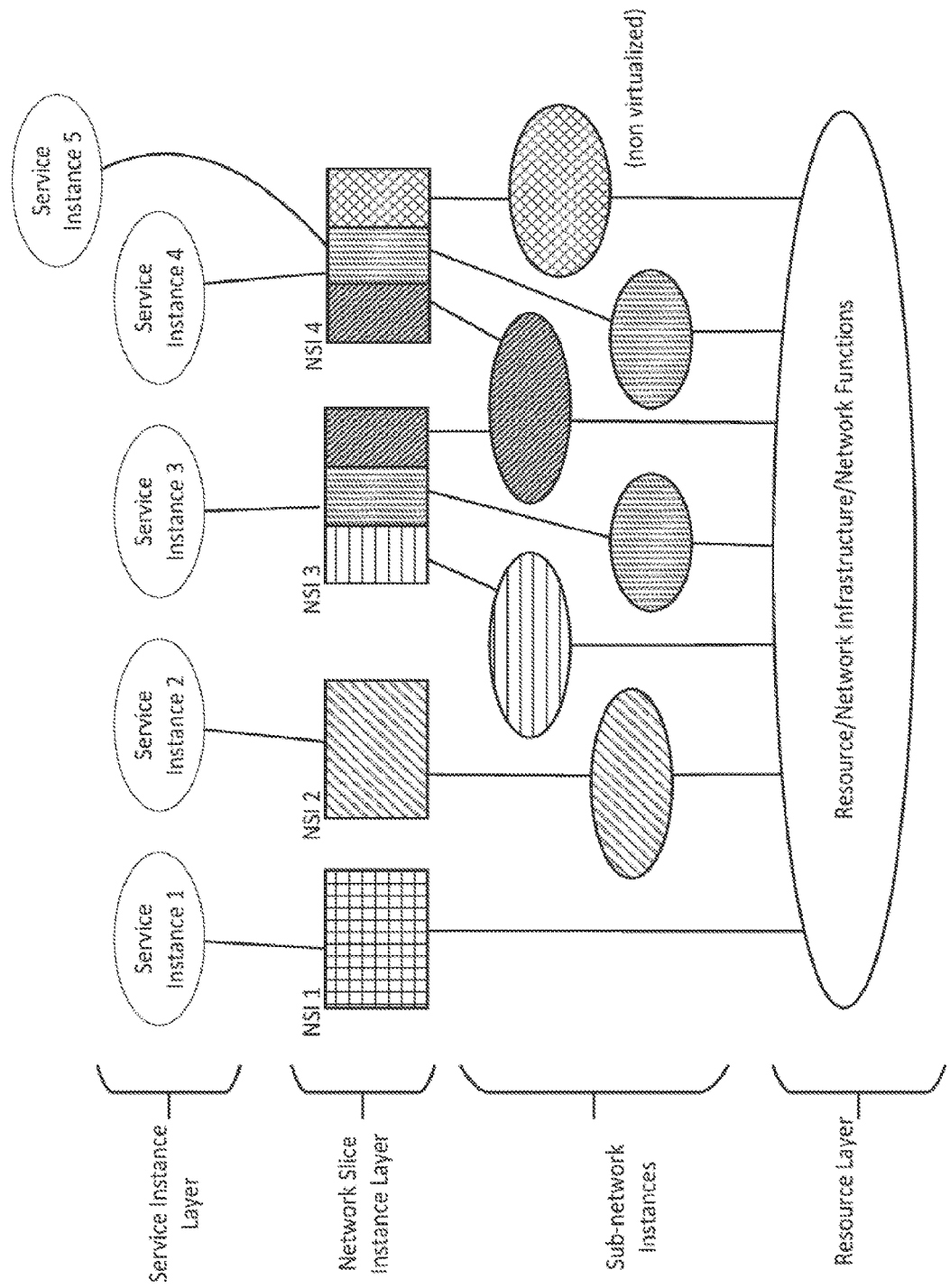
FIG. 11 is a diagram illustrating a network slicing concept.

The NGMN Alliance document, "Description of Network Slicing Concept", (160113_Network_Slicing_v1_0.pdf) describes "network slicing" as a mechanism that may be used by mobile network operators to support multiple 'virtual' networks behind the air interface across the fixed part of the mobile operator's network, both backhaul and core network. This involves "slicing" the network into multiple virtual networks to support different RANs or different service types running across a single RAN. Network slicing enables the operator to create networks customized to provide optimized solutions for different market scenarios which demands diverse requirements, e.g., in the areas of functionality, performance and isolation. FIG. 11 shows a conceptual architecture of network slicing.

A network slice instance is made up of a set of network functions and the resources to run these network functions. In FIG. 11, cross-hatching is used to indicate the different network slice instances or sub-network slice instances. A sub-network slice instance comprises a set of network functions and resources to run those network functions, but is not in itself a complete logical network. A sub-network slice instance may be shared by multiple network slice instances 3GPP is designing a 5G network and is considering to incorporate the network slicing technology. This technology is a good fit for the 5G network, because the 5G use cases (e.g., massive IoT, critical communications, and enhanced mobile broadband) demand very diverse and sometimes extreme requirements. The current pre-5G architecture utilizes a relatively monolithic network and transport framework to accommodate a variety of services such as mobile traffic from smart phones, OTT content, feature phones, data cards, and embedded M2M devices. It is anticipated that the current architecture is not flexible and scalable enough to efficiently support a wider range of business needs when each has its own specific set of performance, scalability, and availability requirements. Furthermore, introduction of new network services should be made more efficient. Nevertheless, several use cases are anticipated to be active concurrently in the same operator network, thus requiring a high degree of flexibility and scalability of the 5G network.

Network slicing enables the operator to create networks customized to provide optimized solutions for different market scenarios which demand diverse requirements, e.g., in the areas of functionality, performance and isolation. However, there are some challenges and issues to support network slicing in the future 5G network including: how to achieve isolation/separation between network slice instances and which levels and types of isolation/separation will be required; how and what type of resource and network function sharing can be used between network slice instances; how to enable a UE to simultaneously obtain services from one or more specific network slice instances of one operator; what is within 3GPP scope with regards to Network Slicing (e.g., network slice creation/composition, modification, deletion); which network functions may be included in a specific network slice instance, and which network functions are independent of network slices; procedures for selection of a particular network slice for a UE; how to support Network Slicing Roaming scenarios; and how to enable operators to use the network slicing concept to efficiently support multiple 3rd parties (e.g., enterprises, service providers, content providers, etc.) that require similar network characteristics.

Examples of issues, problems, and possible solutions may be found in 3GPP TR 23.799, Study on Architecture for Next Generation System, which describes how 3GPP may be apply the network slicing in the 5G network architecture.

A multicast/broadcast network function (MBNF) may be used for providing the broadcast and multicast service in 5G network. MBNF is a logical function, and it may be co-located with other NFs such as SMF.

Figure 12:
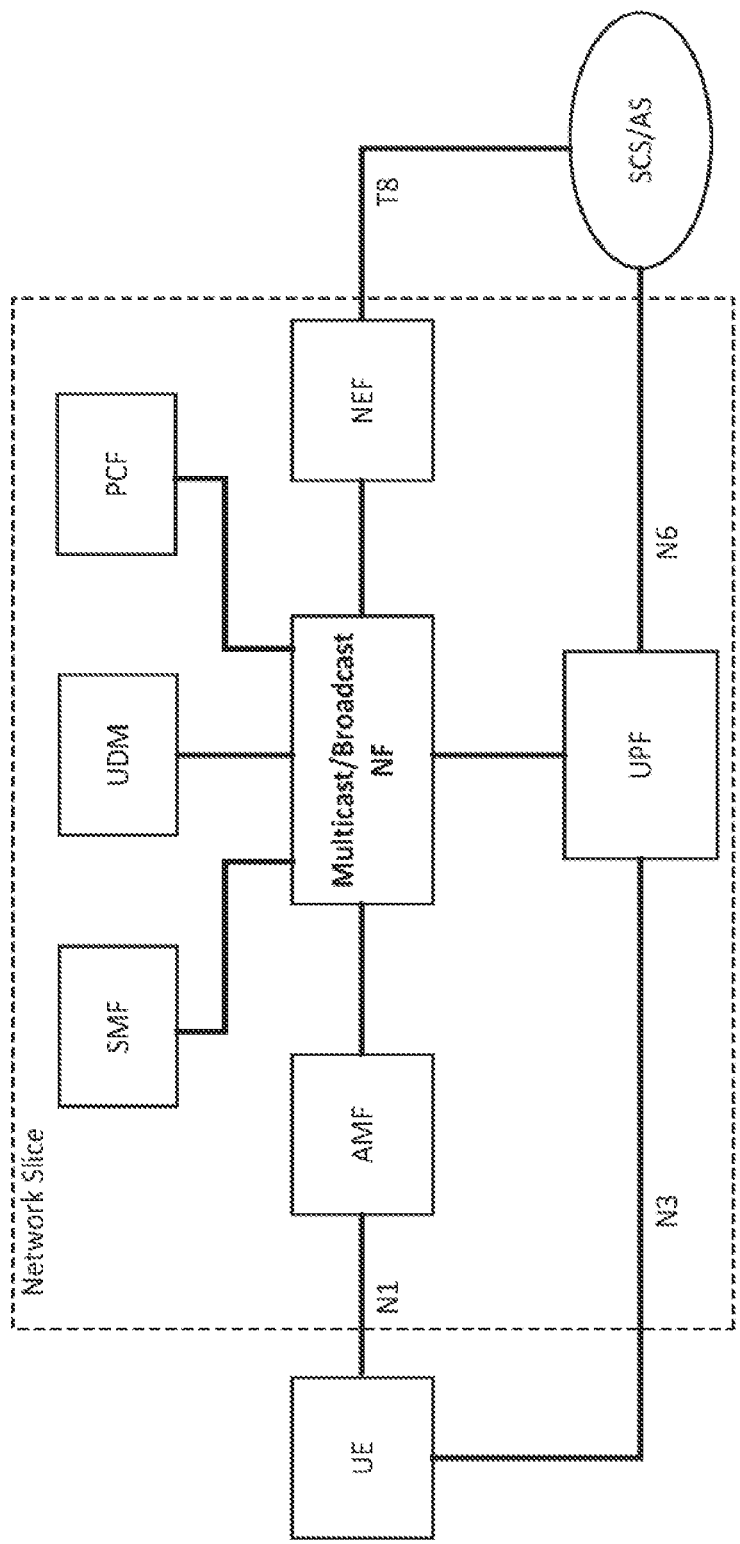
FIG. 12 shows a diagram of an example Multicast/Broadcast Network Function (MBNF) in a network slice.

From architecture perspective, the MBNF may be included in a network slice. FIG. 12 shows the architecture, where AMF and/or UDM may be common NFs to multiple network slices. The fact that an MBNF is part of the slice may be captured in the Slice Differentiator (SD) field of S-NSSAI field of the Single Network Slice Selection Assistance Information (S-NSSAI).

Alternatively, a network slice may be dedicated to providing particular type(s) of broadcast/multicast service(s) and the type of desired service may be indicated in the Slice/Service type (SST) field of the Single Network Slice Selection Assistance Information (S-NSSAI). For example, the SST field may indicate that a connection to a broadcast slice is desired. Further, the Slice Differentiator (SD) field of S-NSSAI may indicate what type of broadcast is supported. For example, the SD field may indicate that a connection to a particular content provider's broadcast is desired. For example, a content provider may be a provider who is streaming a sporting event or an IoT Service Provider that is broadcasting emergency indications to IoT devices in an area. The SD field may further indicate what location the UE is in or what locations that UE will be in so that the network can select a slice that will broadcast in the areas where the UE can be reached. The SD field may further indicate what type of content is broadcast (e.g., TV, PWS messages, etc.). The SD field may further indicate what format the data is broadcast in (e.g., NAS, IP, non-IP, TV, MPEG, etc.). In this option, the dedicated network slice may contain only the NFs that are involved in broadcast and multicast activity. For example, SMF and UPF shown in FIG. 12 may not be included in the network slice that is dedicated for the broadcast/multicast service. Alternatively, they may be included if they participate in providing the broadcast content to the UE or are required so that the UE and content provider can interact in order to deliver the broadcast content. A new information element may be defined for a network slice, and be used for broadcast/multicast service. When network slice information is requested, this information will be involved. For example, UE may request to connect a network slice providing broadcast of PWS data, or SCS/AS wants to register with a network slice that is capable of broadcasting non-IP data.

Figure 13:
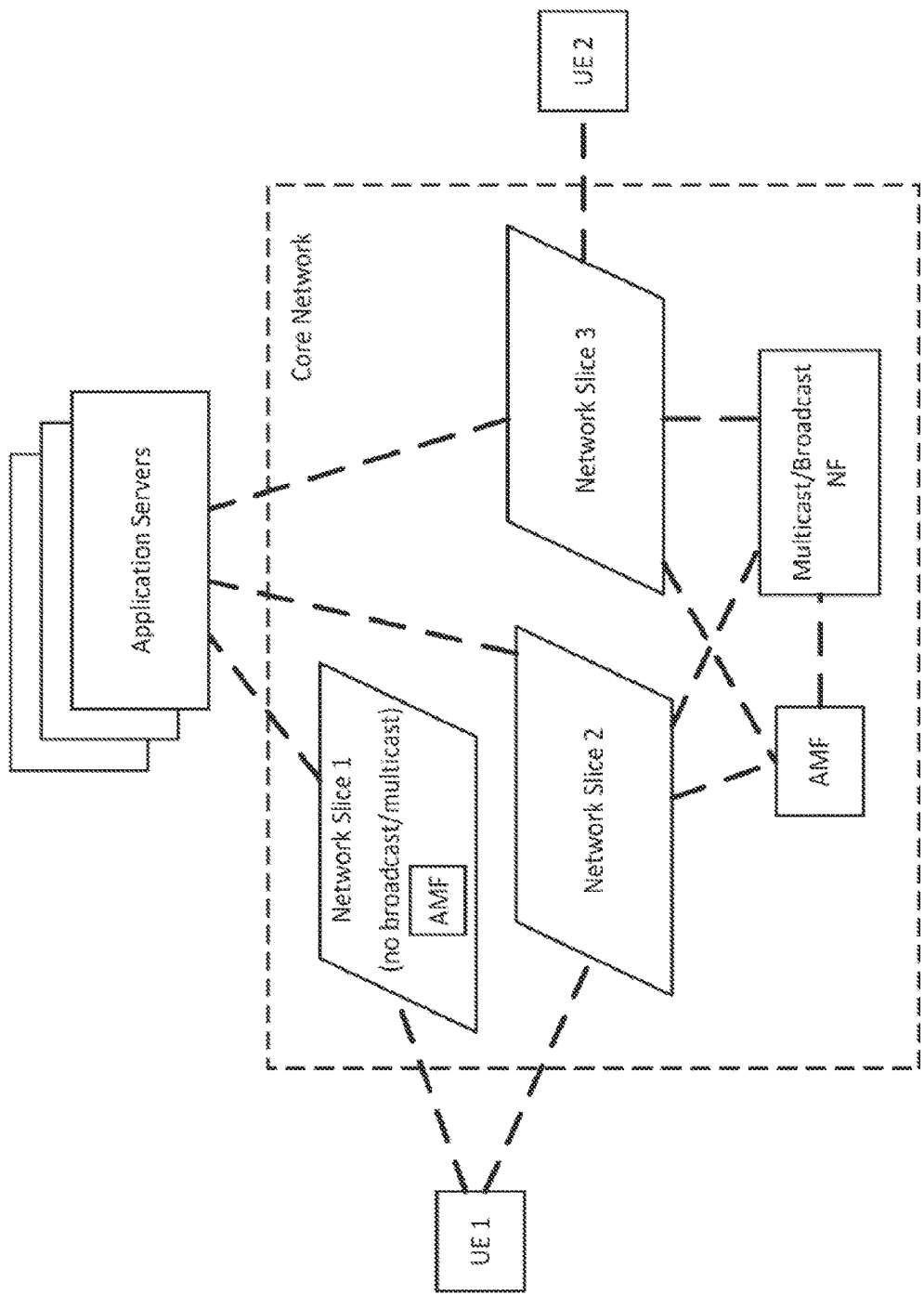
FIG. 13 shows an example broadcast/multicast service with common AMF and MBNF serving multiple network slices.

Alternatively, the MBNF may exist outside of any specific network slice. For example, it may be a common network function to multiple network slices. In such a scenario, it interfaces to multiple network slices that send broadcast/multicast requests to the MBNF. The MBNF may grant or deny broadcast/multicast resources to the network slices. The network slice may have a MBNF-INTF (MBNF Interface) NF that interfaces to the MBNF and receives content from content providers to broadcasts. The content may be a video, a small message for IoT devices, etc. FIG. 13 shows the architecture where MBNF and AMF are common NFs serving network slice 2 and 3. The interface between the MBNF and each individual network slice may be a unified service based interface (e.g., MBNF-INTF) for broadcast/multicast service.

During the registration or session management process, the UE may implicitly request that the network grant it access to the MBNF by asking for a connection to a network slice that includes an MBNF.

Figure 26:
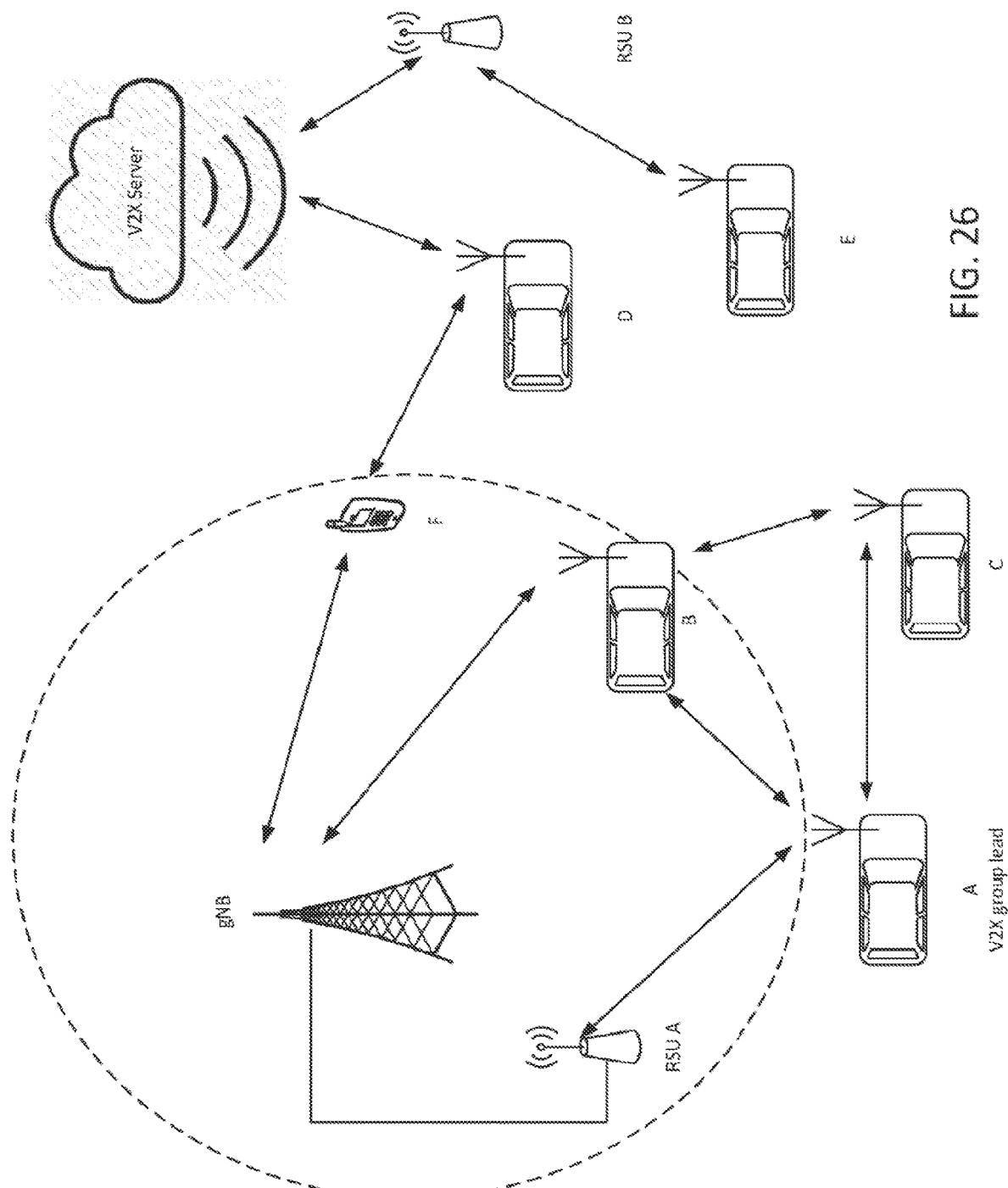
FIG. 26 is a block diagram of an example system of a V2X use case.

Another option regarding the architecture shown in FIG. 12 is that the Application Server is located distributedly, so that the UE may access the SCS/AS directly without having to go through the core network. An example in a UE-type RSU in a V2X use case, such as in the example of FIG. 26, where UE may communicate with a UE-type RSU directly over a PC5 interface, which is defined in 3GPP ProSe. However, the UE may still need to register with network for authentication and authorization for using this type of service, e.g., for direct communication with other UEs or Application Server out of 3GPP network coverage.

For exchanging the control message with UE, such as establishing the session for broadcast and multicast, an MBNF may send a message to and AMF. The AMF may then forward the message to the UE on top of NAS-MM signaling. Alternatively, MBNF control signaling may be treated as a session management function specific to the broadcast and multicast communication, as compared with SMF defined managing for unicast communication. In this sense, control signaling between MBNF and UE may be viewed as a part of NAS-SM for broadcast and multicast communication on top of the NAS-MM according to FIG. 10. More details about establishing connection in control plane are discussed in relation to FIGS. 17A to 17C.

A UE's reception of the broadcast from the MBNF may or may not be transparent to the MBNF. In other words, the MBNF may or may not know that a UE is listening to a broadcast or is authorized to listen to a broadcast. For example, the availability of the MBNF may be advertised to the UE during the registration, and the UE may listen to the selected broadcasts or the UE may interact with the MBNF to obtain access to particular broadcasts/multicasts. More details about this interaction are discussed in relation to FIGS. 15A to 15D. The UE's interaction with the MBNF to obtain access to particular broadcasts/multicasts may entail explicitly requesting that the MBNF grant it access to particular broadcasts/multicasts or establishing a connection to an MBNF may result in the UE having access to all of the MBNF instance's particular broadcasts/multicasts. The request to the MBNF may be sent via NAS-SM-MB or MB Signaling as show in in FIG. 14.

Figure 14:
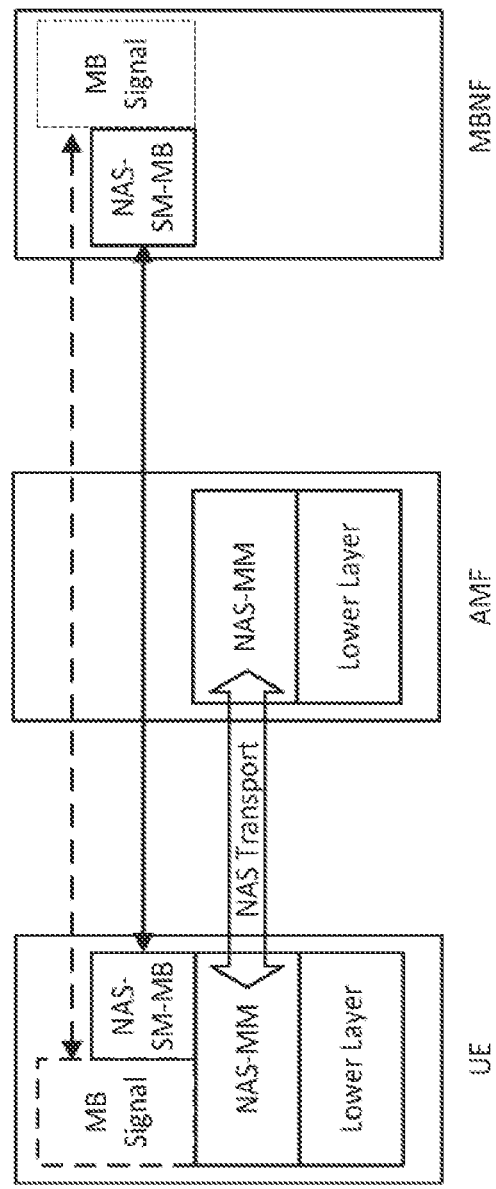
FIG. 14 shows an example protocol stack for control signaling of MBNF.

FIG. 14 shows two examples of options regarding the control plane protocol stack of the MBNF. In the first example, an MBNF control signal is a part of NAS-SM signal, which is called NAS-SM-Multicast/Broadcast (MB). In this approach the MBNF is a special type of SM-NF that can support signaling for establishing and managing broadcast sessions. In the second example, an MBNF signal is defined as a separate control signal on top of NAS-MM signaling. Thus the MBNF signal is independent of the NAS-SM signaling.

An entity may subscribe to a broadcast/multicast service during registration. A UE may indicate its intention to use, or access, the broadcast/multicast service. A UE may have two PDU sessions, for example, where one is for the unicast communication managed by SMF, and the other one shared with a group of UEs is for the broadcast/multicast managed by MBNF. Depending on the particular architecture used, such as those discussed in reference to FIGS. 12, 13, and 14, the UE may connect two network slices for each of session respectively, or one network slice for both sessions with a common MBNF managing the session for broadcast/multicast. Alternatively, the SMF may manage both sessions. In a further alternative example, an SMF may incorporate the functionality that is described herein as being in the MBNF.

FIGS. 15A to 15D show the general registration procedure of section 4.2.2.2.2 of 3GPP TS 23.502, Procedures for the 5G System, Stage 2, v0.5.0, Release 15. Changes are described herein to steps 1-5, 14A, 14B, 16, 17, and 21 of the 3GPP TS 23.502 the general registration procedure to support broadcast/multicast services. See 3GPP TS 23.502 for further details on the information normally involved in the general registration procedure is not present. New parameters related to broadcast/multicast for use in steps 1-5, 14A, 14B, 16, 17, and 21 are described herein in relation to FIGS. 15A to 15D.

Figure 15A:
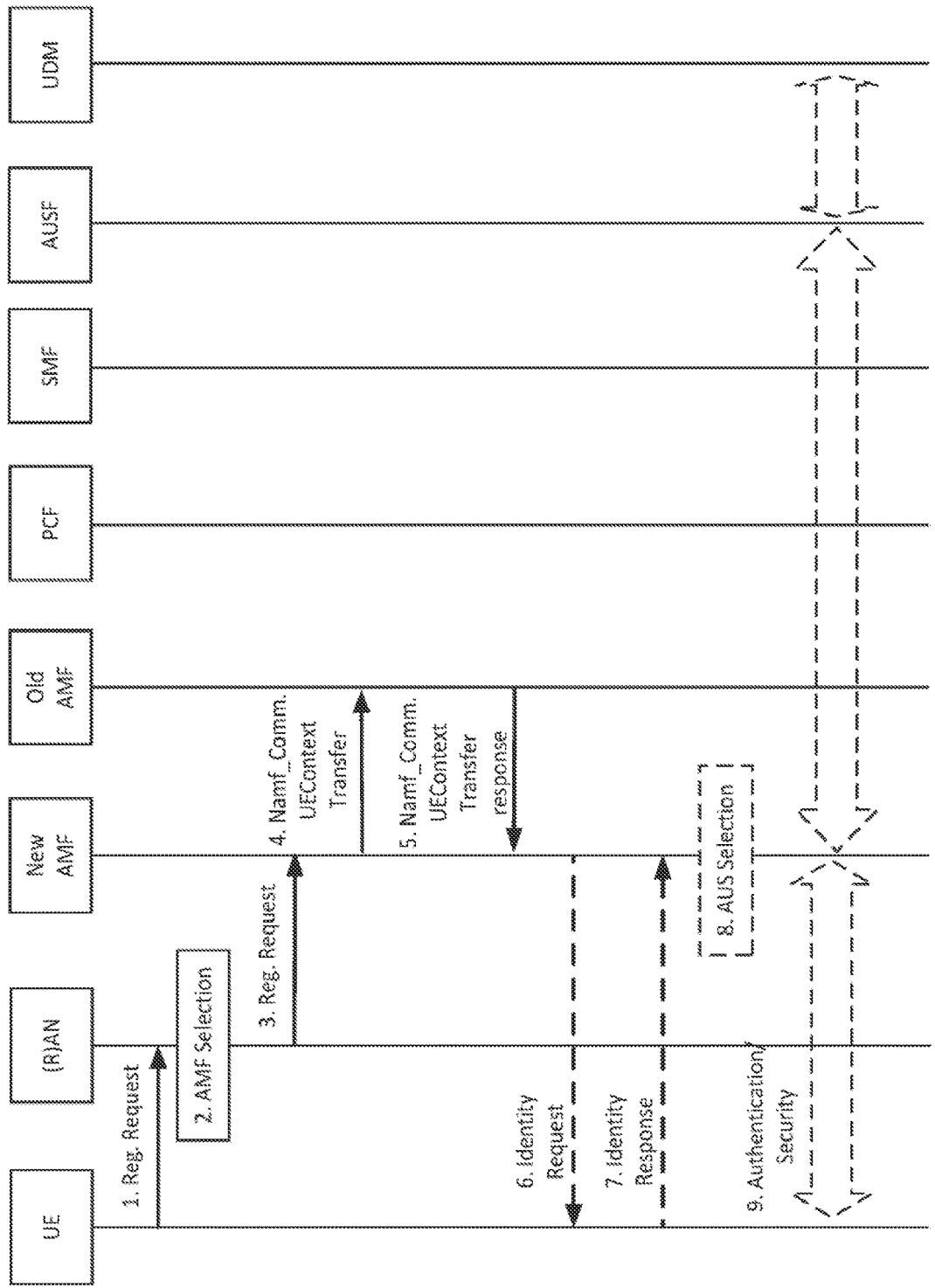
FIGS. 15A-15D show a call flow of an example registration procedure.
Figure 15B:
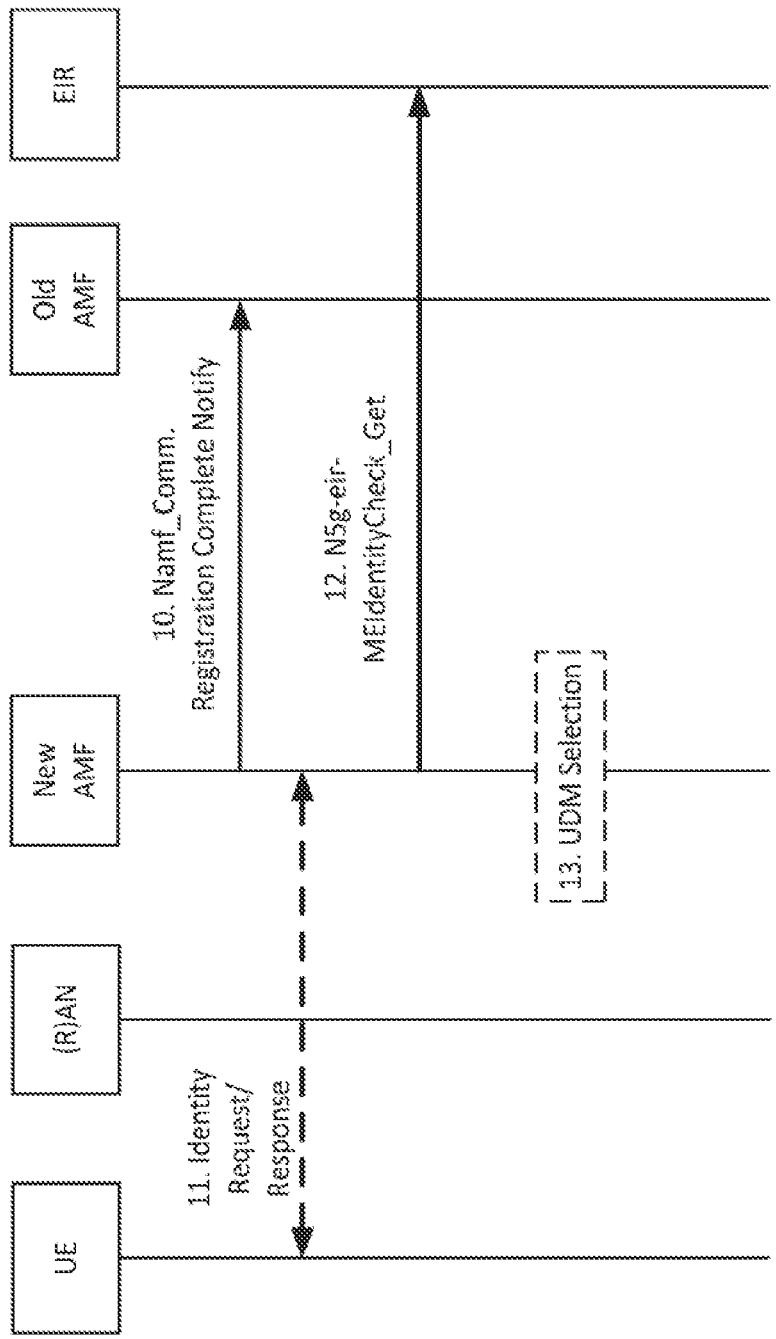

In step 1 of FIG. 15A, in the registration request message, UE indicates in the message that it intends to subscribe, or access or use, the broadcast/multicast service. The request may include: an intention indication that UE wants to use the broadcast/multicast service provided by the core network; a group ID (e.g., TMGI) that is previously used for receiving broadcast/multicast data; an SCS/AS ID that originates the data; application information (e.g., an application ID) with which the broadcast/multicast data is associated. This may be the identity of the application on the UE that will be listening to the broadcast, an identity of the type of application on the UE that will be listening to the broadcast, identity of the application that is generating the broadcast, or an identity of the type of application that will be generating the broadcast. In addition, this information may be used in combination with Group ID, source ID, and/or SCS/AS ID, to indicate that the UE is interested in the application data which is delivered by broadcast/multicast to a group of UEs from a certain provider. The UE may not know whether such group exists, whether the application service provider (indicated by SCS/AS ID) forms such a group, or how many such groups are formed by different providers for the same application. The UE may directly enable a group discovery within the network. It is up to network to make the decision, and to provide the UE with any required information.

Group discovery indication may be used by a UE when the UE wants to join a group in order to receive certain application data through broadcast/multicast, but the UE does not know if such a group or such application data is available through the network. The UE may also specify a list of attributes to help the group discovery process, such as App ID, application provider ID, UE location, UE reachability information (e.g., a UE's schedule for receiving data), UE status, and/or UE radio capability.

The request may include: network slice ID that previously served the UE; an MBNF ID, which may be a MBNF in a network slice or a common MBNF serving multiple network slices; an ID of AMF that is serving the session related NAS signal between UE and MBNF, and/or the entity to forward the MT data to RAN nodes through control plane path; a network slice ID, indicating which network slice the UE wants to connect, especially when the AMF and/or the MBNF is the common network function for broadcast/multicast service; and the Registration Request includes an NSSAI which is comprised of S-NSSAI's. One or more of the S-NSSAI's may indicate to the network that the UE wants to use the broadcast service. For example, an SST or SD value may be used to indicate that the UE wants to listen to a slice that provides broadcast services. The SST or SD value may further indicate the type of broadcast services that the UE wants to listen to (e.g., TV, PWS, MTC, Non-IP, IP, Application Specific, etc.). Furthermore, the SST or SD value may indicate the specific MBNF or Content Provider that can provide the desired broadcast content. Furthermore, the SST or SD value may indicate the specific area where the content needs to be available. The request may include a broadcast session ID that the UE would like to access. The broadcast session ID may be part of an SST or SD field.

If the UE is a constrained device (e.g., temperature sensor), the UE may be in the power saving mode most of the time. Therefore, in the request message, UE may request the network buffer the mobile terminated broadcast data that the UE is supposed to receive.

UE may request to subscribe certain broadcast service and related traffic, but indicate not to establish the PDU session until the service provider (e.g., SCS/AS) request to start broadcast.

The UE may indicate a preference for enabling a local broadcast/multicast service. This may take various forms. For example, the UE may want to receive some contents broadcast by a LADN, and therefore the UE may specify the DNN of the LADN, service area of the LADN, or application information such as advertisement within a geographic region. Additionally or alternatively, the UE may want to broadcast its own contents through a LADN, and therefore the UE may indicate more information such as broadcast area it wants to cover, application information of its content.

The UE may indicate a QoS requirement, such as a data rate and/or a latency requirement, for both downlink and uplink, and for different types of coverage, such as LTE and 5G. For example, the UE may indicate a QoS requirement for the application data it is interested in for the group communication, which is identified by application information, group ID, SCS/AS ID, or combination thereof. The indication of the QoS requirement may include, for example, the data rates of the broadcast/multicast data, the frequency of the broadcast/multicast, and/or a 5G QoS Identifier.

The UE may indicate the UE's status. The status may include the information such as the UE's location, the UE's mobility pattern, the tracking area/registration area of UE, a UE reachability schedule, the UE's radio capability, and the UE's processing and storage capability.

The UE may request an out-of-coverage broadcast/multicast, whereby the UE is allowed to receive broadcast/multicast data without going through the network. For example, a UE-type RSU in a V2X use case, such as in the example of FIG. 26, may receive a message directly from the RSU via PC5 interface. In addition, the UE may also request to be allowed to send out message via side link, e.g., the message is broadcast without going through the network.

In step 2 of FIG. 15A, the RAN node selects the AMF that supports the broadcast/multicast capability (e.g., the AMF is capable of broadcasting MT data via NAS signal) if AMF ID is not given by UE in step 1. This requires RAN nodes be aware of broadcast/multicast capability of AMFs which the RAN node connects with. AMF may send this information to RAN nodes when the N2 connection is established between AMF and RAN node. Note that AMF selection may alternatively be based on whether or not the AMF can connect to a slice that supports the broadcast/multicast capability or connect to an MBNF. The AMF may indicate its ability of connecting to an MBNF to RAN nodes when the N2 connection is established between AMF and RAN node.

In step 3 of FIG. 15A, in the request sent to AMF, RAN node may insert some information related to the broadcast/multicast besides those in step 1, for example, broadcast/multicast area information that the RAN node can cover or RAN resources that are available for broadcast. This information can be used by AMF to determine which RAN node is involved to broadcast downlink data to a set of UEs. Specifically, the target UE may move around, the AMF may use this information to determine which RAN node can reach the UE.

In step 4 of FIG. 15A, the new AMF may add some information in the request to the old AMF related to the broadcast/multicast, for example, query if any existing group includes the UE, query if any existing session that is created and used to provide broadcast/multicast service to the UE, MBNF and/or SMF identification information if UE has subscribed broadcast/multicast service with old AMF.

It is possible that the old AMF provides only the broadcast/multicast service for the UE. In other words, the old AMF is a common AMF for providing the broadcast/multicast service. In this case, the new AMF may request to activate the broadcast/multicast connection for the UE if there was a connection established by the old AMF. The new AMF may get this information from a RAN node from step 3 when RAN node selects the new AMF, and provides some additional information of the old AMF. In fact, the old AMF can be called broadcast/multicast AMF. The UE will be served by two AMFs. A new AMF provides everything except broadcast for UE. An old AMF provides broadcast/multicast service to UE.

In step 5 of FIG. 15A, the old AMF returns the response message including the information the new AMF requests in step 4. In case that the old AMF is expected to provide only broadcast/multicast service, the old AMF will notify the new AMF about this, and the new AMF will provide mobility management for unicast communication. This may affect the selection of SMF and UPF.

Figure 15C:
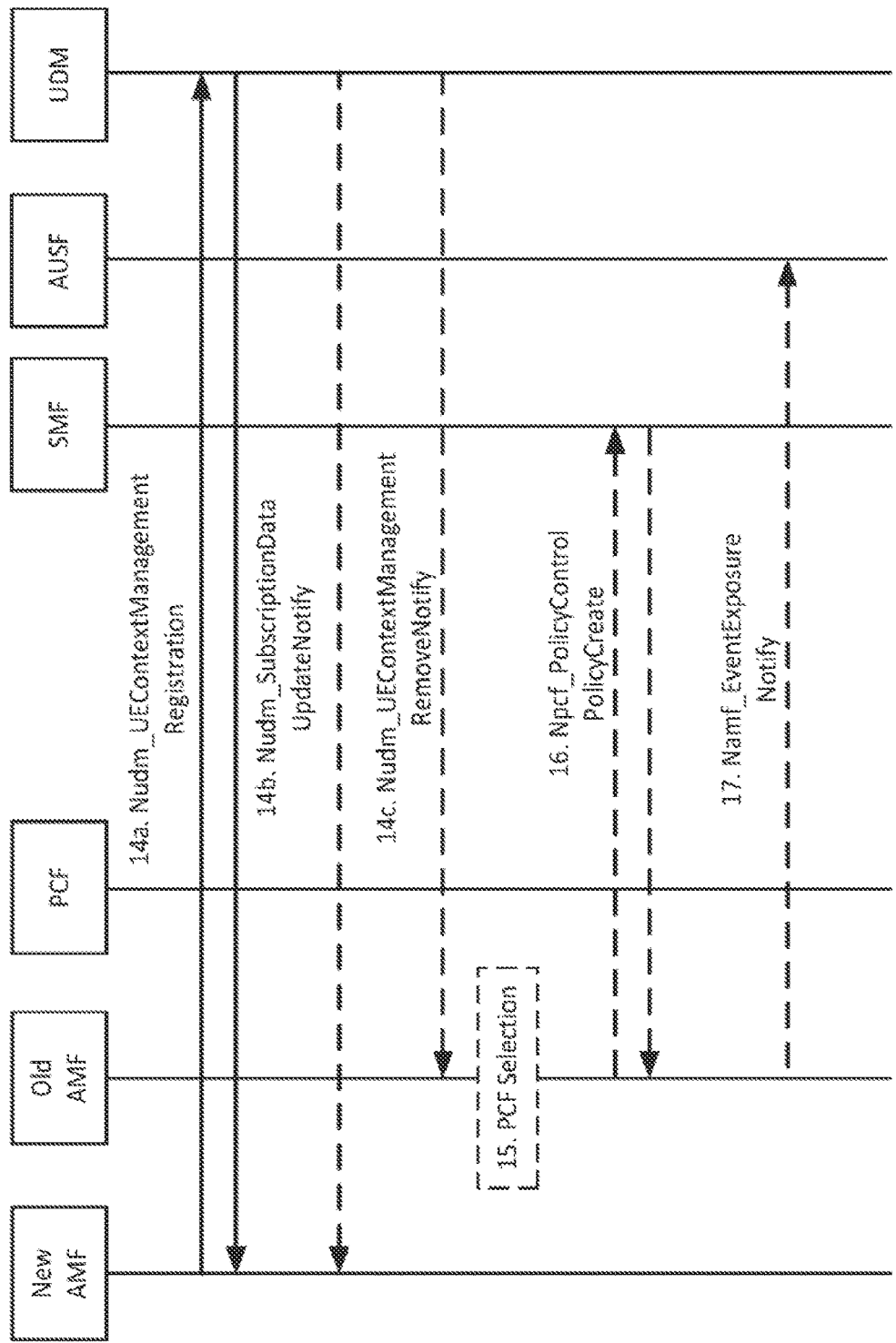
Figure 15D:
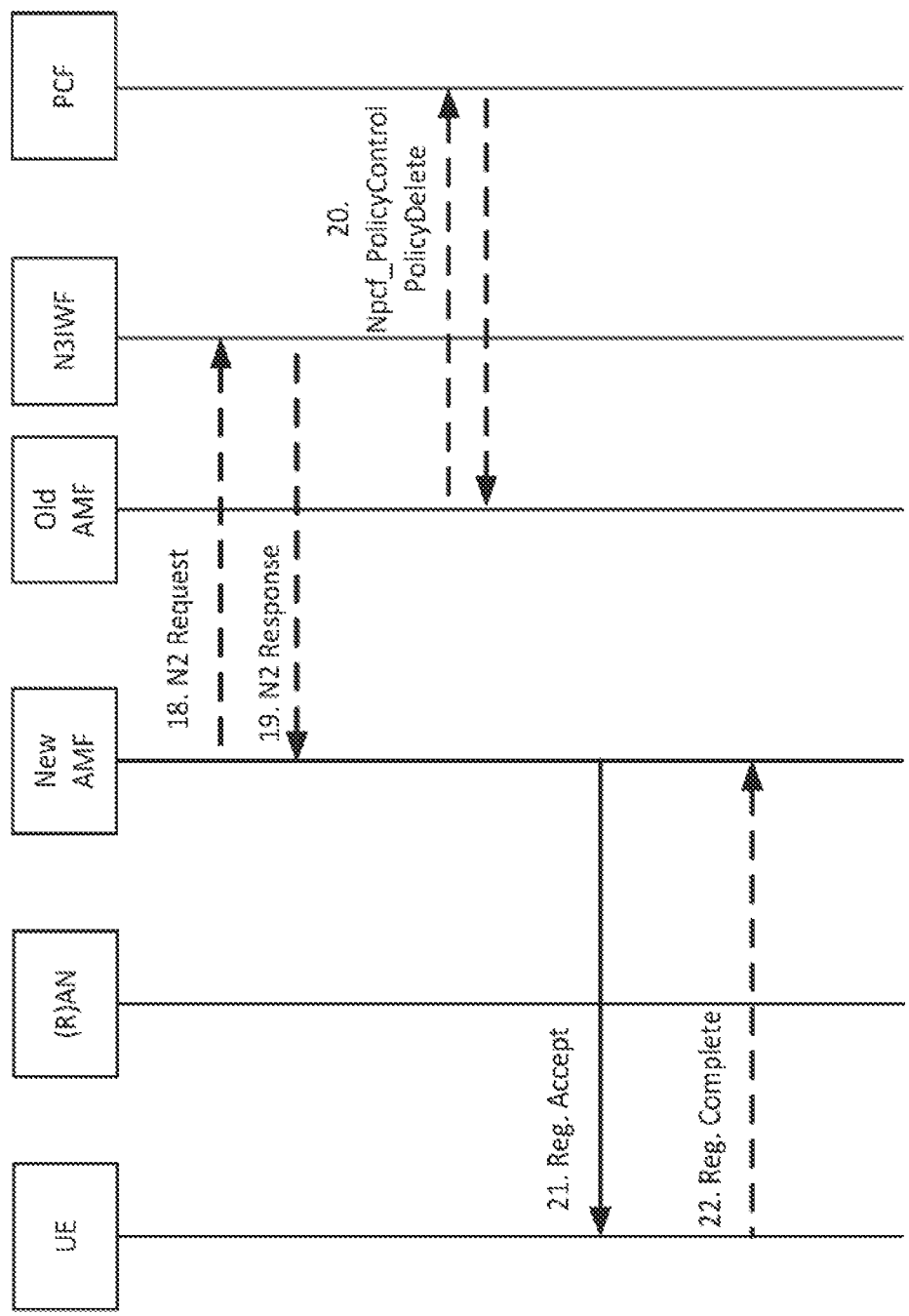

In steps 14a and 14b of FIG. 15C, the new AMF may retrieve some broadcast/multicast related subscription information about the UE from the UDM, such as whether the UE is allowed to receive broadcast/multicast data, the service area information within which the UE is allowed to receive broadcast/multicast service from the core network, the maximum number of groups a UE can join, application information (e.g., application ID or SCS/AS ID) that the broadcast/multicast data is about or that cannot be sent to the UE through broadcast/multicast. This step may also be used to check if the UE is allowed to access broadcasts from the content provider or session or slice that was indicated by the UE in step 1.

In step 16 of FIG. 15C, the new AMF requests PCF to provide some policy configuration of the broadcast/multicast communication for the UE or for the broadcast session. For example, QoS setup for the broadcast/multicast session may depend upon whether broadcast/multicast is supported when the UE is roaming or UE connects to a local data network. The policy content in PCF related to broadcast/multicast may be configured by the network operator or the service provider (SCS/AS).

In step 17, the new AMF may send an exposure event notification, e.g., including a UE reachability state with a PDU status. Optionally, the new AMF also reaches the SMF about the broadcast/multicast service if the MBNF is co-located with the SMF. The information included may be whether there are enough resources to provide broadcast/multicast service to the UE, whether there is an existing group which the UE may be added to for broadcast/multicast communication. If a UE requests to join a group communication to receive broadcast/multicast data for a specific application, the AMF may query the SMF with the application information, group ID, SCS/AS ID, and/or QoS information to see if any such group is formed. Such information is described in the discussion of Step 1. The SMF may check whether any existing group meets UE's requirements. If there is no such group formed for group communication, the SMF may indicate that to the AMF. If multiple application servers (e.g., more than one provider) form the groups for the same application, the SMF may pick one group for the UE based on the QoS, service area of the groups, registration area, tracking area of the UE, UE mobility (e.g., speed), and/or UE capability, for example. The SMF may also allow the AMF to make the decision, since the AMF knows more location information about the UE and the RAN node involved in the group communication.

In step 21, new AMF notifies the UE about the completion of the registration, which may include some information about the broadcast/multicast service based on UE's request, such as AMF ID/MBNF ID that provide the broadcast/multicast service to UE, group ID that UE should listen to the broadcast/multicast data, the session ID that the UE is permitted to listen to, the session ID that the UE should listen to, the area where the broadcast will be available, and the PLMNs, DDN, or LADNs where the broadcast will be available.

For the normal registration process, AMF may use this message to indicate that the network slice connected to the UE provides the broadcast/multicast service, or 5GC has the broadcast/multicast capability. AMF may even advertise which type of application is supported by the broadcast, e.g., IoT smart transportation, smart city. Therefore, by advertising the broadcast/multicast capability of 5GC, UE may request for the broadcast/multicast service. The MBNF ID may also be broadcasted, for example, in system information so that the AMF can make a determination as to which eNBs to attach to, based on whether or not the UE can reach the desired MBNF ID.

If the UE wants to broadcast its content via a LADN, this message indicates whether or not the UE has to be in the service area of the LADN for broadcasting its data within the LADN.

If the UE is looking to join an existing group for a certain application data broadcast, the AMF may provide the UE with the group ID (e.g., a TMGI), an SCS/AS ID, a broadcast/multicast schedule, and/or the session information created for the group communication. Optionally, the group related security key may be provided to the UE, so that the UE is able to decrypt the broadcast data it receives. If the UE requests a group discovery in step 1, the discovery may be initiated by MBNF, and the discovery results may be returned to the UE by the AMF. If the UE requests authorization to receive and/or broadcast a message in the out-of-coverage manner, the AMF may return the authorization results to the UE.

With broadcast/multicast capability exposed via NEF, the service provider (e.g., SCS/AS) may want its service or application data to be delivered through broadcast/multicast communication within the core network. This may take place when SCS/AS registers with the core network, or when SCS/AS updates its service/application provision with the core network.

Figure 16:
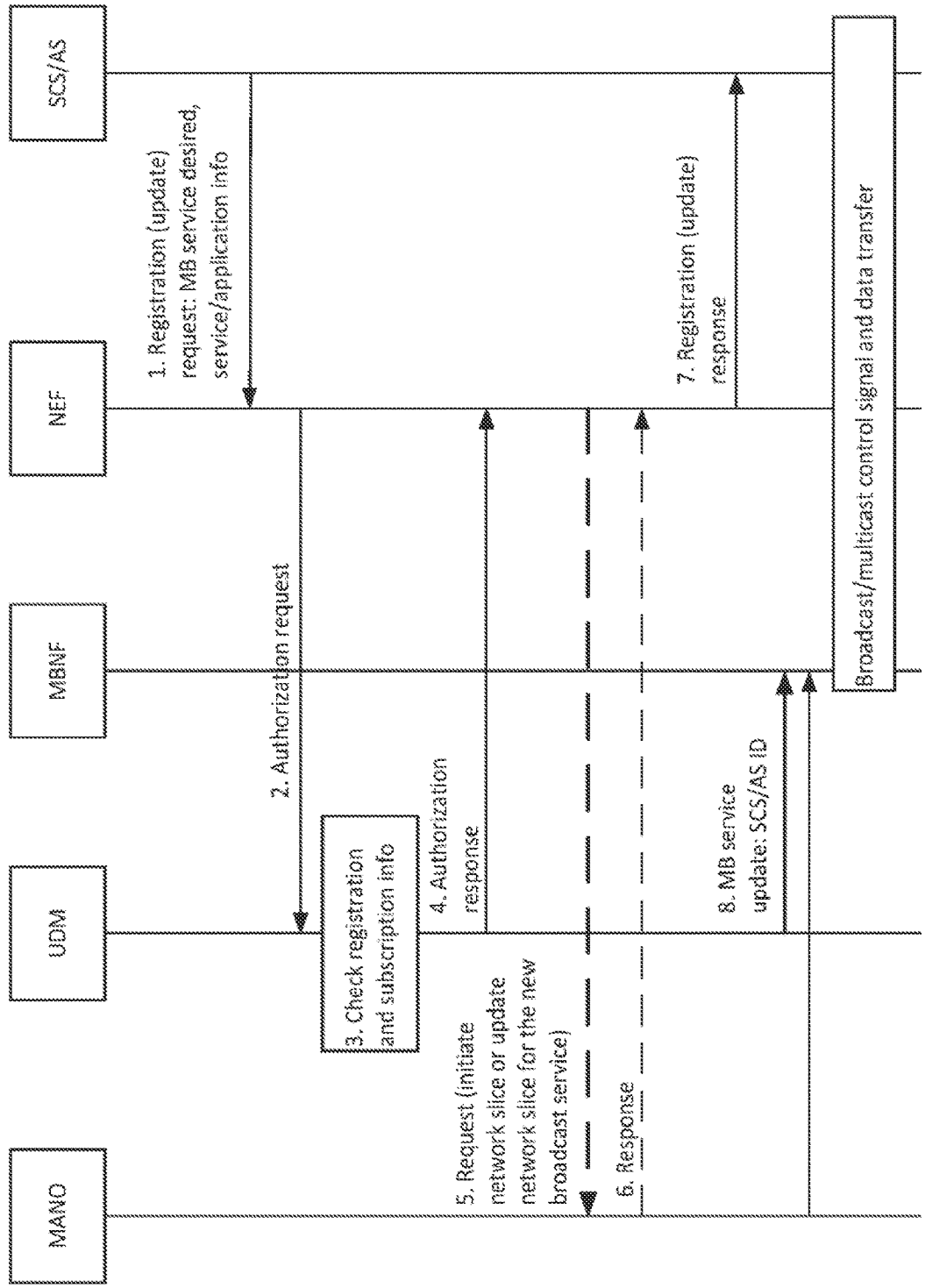
FIG. 16 shows a call flow of an example service provider request for broadcast/multicast service in 5G network.

FIG. 16 shows an example service provider request for broadcast/multicast service in a 5G network.

In step 1 of FIG. 16, SCS/AS requests to transfer its application data via broadcast/multicast communication within the core network. The SCS/AS may include the various information related to broadcast/multicast in the request. For example, the request may include any of: information about the application that SCS/AS wants to deliver the data by broadcast/multicast; data type, e.g., IP data, non-IP data or Ethernet; data buffering configuration, indicating if service provider wants the MT data buffered for certain events, such as some UEs that are not available for some time; and the Slice or slice type (NSSAI) that should be used to send the data. The request may include: the session ID that should be used to send the data; the time when the data should be sent; the area where the data should be sent; the DDNs or LADNs where the data should be sent; and how frequently the broadcast will take place.

The request may include an indication of whether the service provider wants to utilize only the transport capability for broadcast/multicast or the full broadcast/multicast service to transfer its application data. The full broadcast/multicast service means the MBNF will process the data from AS by considering the context and/or application information. For example, an MBNF may assign different priorities or different amount of resources to the application data from an AS when establishing the PDU session for broadcast. Transport only means MBNF provides only the broadcast and multicast communication capability without any context-awareness or application content awareness. AS is responsible for dealing with all the context related differentiation.

The request may include an indication of whether the broadcast/multicast data is from a local area data network (LADN), and may include an indication that the broadcast/multicast data is periodic, and the corresponding time interval between each broadcast.

An SCS/AS may also request to form a group to transfer its application data by broadcast/multicast. The SCS/AS may provide: application information (e.g., App ID); QoS information, such as data rate and/or latency, for both downlink and uplink, and for different types of coverage, such as LTE and 5G; a data transfer schedule, and/or location information (e.g., a specific service areas, geographic location, or tracking areas) for the group communication. The application server may want to broadcast its data within a certain area, but may not know (or care) how many UEs are in the area, and therefore the application server may allow any UE registered to the network in the area to receive the data.

An SCS/AS may specify some attributes/parameters about the broadcast or group communication, such as the maximum number of UEs allowed in the group, the communication range of the communication from a RAN node to a UE in the group, the schedule of the broadcast message (e.g., about 10 messages per minute, 1 message every hour).

An SCS/AS may indicate whether UEs in the group are allowed to transfer the broadcast message to other UEs in or out of the group, e.g., relay to the UEs that are not in the group.

An SCS/AS may indicate whether its broadcast or group communication will go through the network. In other words, the broadcast/multicast is in coverage or out of coverage of 3GPP network. For 3GPP coverage, an AS may indicate it is LTE only coverage, 5G only coverage, or both, for example.

An SCS/AS may indicate the types of 3GPP coverage for the broadcast or the group communication, e.g., LTE, 5G, out-of-coverage, or a combination of two or more of these.

An SCS/AS may specify a Source ID to indicate which entity originates the broadcast/multicast message. The source ID could be in different forms, such as IP address, 5G-GUTI, SUPI, 5G-TMSI, or external ID.

In step 2, the NEF sends an authorization request to UDM to check whether the SCS/AS is allowed to use broadcast/multicast service for the applications indicated by SCS/AS. This message may include the information in step 1 so that the NEF can check whether the SCS/AS is allowed to broadcast in the specific slice, area, time, etc. that was requested in step 1.

In step 3, the UDM checks the registration and subscription it maintains about the SCS/AS, and add the broadcast/multicast service subscription of the SCS/AS and related applications into the data base it maintains.

In step 4, the UDM returns response to indicate if SCS/AS is authorized to use the broadcast/multicast service for a certain application as it requests.

In step 5, after authorizing the request, the NEF asks that the broadcast resources be reserved. This may involve making a request to the MANO system to instantiate a network slice with the NSSAI that was provided in step 1 or provided by the UDM in step 4. This may involve making a request to the MANO system to instantiate, scale up, or scale down a network function, such as an MBNF within an existing network slice. This existing network slice may have been provided in step 1 by SCS/AS or in step 4 by the UDM. Scaling up or scaling down a network function means reserving more, or less, resources for an existing network function. It may be the case that the SCS/AS will provide the broadcast content not to the NEF but to a UPF or a special type of UPF that is used for sending broadcast content. When this is the case, this request to MANO may also be a request to instantiate, scale up, or scale down a UPF.

Note that when the MANO system receives this request, the MANO system will also update the NRF so that the new NF's can be discovered. Also, the MANO system will configure the newly instantiated NF's so that they can communicate with RAN functions and other NF's that are required to reach the desired broadcast area. The MANO system may also notify the RAN, or N3IWF, nodes so that they know to accept data from the newly instantiated UPF or MBNF Network operator may implement MANO system for managing the network slice and network functions in the 5GC. For example, requests to the MANO system may be used to request more resources (e.g., memory, CPU time, etc.) for certain NF's or that new NF's be instantiated within network slices.

Alternatively, the UDM makes this request to reserve network resources.

In step 6, the MANO system responds if the resources were created, reserved, or released, and may provide an MBNF ID, UPF ID, and a Slice ID that may be used to broadcast the content. When a UPF ID is provided, the NEF may also provide tunnel information (e.g., IP Address and Port Number and Session ID) that the SCS/AS can use to tunnel broadcast content to the UPF. For example, the content might not be IP-based content. It may be non-IP data that needs to be tunneled to the UPF. If the broadcast/multicast data is periodic, a schedule ID may be assigned associated with the SCS/AS ID, which can be used to retrieve the periodic schedule and to identify the periodic broadcast/multicast traffic in the future.

In step 7, the NEF confirms with the SCS/AS about the decision from UDM. This message may indicate whether the broadcast is authorized, what network slice the broadcast is authorized for, and the session, or group, identifier that is associated with the request.

In step 8, the UDM or MANO System notifies MBNF that a SCS/AS requests to establish connection for broadcast/multicast. The SCS/AS ID and application information are included in the message sent to MBNF. Moreover, the broadcast/multicast area information may also be included to indicate that the application data from SCS/AS should be broadcast/multicast to UEs within a certain area. Some other types of information may be included, for example, maximum number of applications from SCS/AS that is allowed to use the broadcast/multicast, whether the broadcast/multicast is enabled in the roaming scenario or when a group of UEs are connected to a local data network.

If the AS requests to form a group to broadcast its application data, the MBNF may allocate a group ID (e.g., TMGI), and return the group ID to the SCS/AS via the NEF. In addition, the MBNF may return the policy for the future broadcast data transfer, including a schedule of the data transfer and QoS parameters (e.g., data rate and/or latency for both downlink/uplink and for different types of coverage, such as LTE and 5G). If the MBNF is co-located with the SMF, the SMF may perform these operations.

Note, the procedure may be implemented as a part of the registration process between SCS/AS and the core network. The registration process includes many other parameters, while only those related to broadcast and multicast service are described. Herein, the terms AF and AS may be interchangeable with SCS/AS.

An SCS/AS may execute a procedure like the one described in connection with FIG. 16, for example, in order to update or modify the parameters that are associated with the group or with the broadcast. For example, the SCS/AS may wish to change the area over which the data is broadcast.

An MBNF may initiate a connection for broadcast/multicast service, and the broadcast/multicast session may be created through the control plane (e.g., via AMF) or user plane (e.g., via UPF).

The UE may initiate this procedure after receiving a device trigger, such as a NAS or SMS message, which indicates when the broadcast will occur, what group identifiers are associated with the broadcast, etc.

The UE may indicate to the MBNF that it wishes to listen, or subscribe, to a particular broadcast/multi-cast. Alternatively, the MBNF may learn that a UE wants to listen, or subscribe, to a particular broadcast/multi-cast from the UE's subscription information in the UDM or it may be told by a SCS/AS via the NEF. When the MBNF knows that a UE wants to listen to a particular broadcast/multi-cast and the broadcast/multi-cast time is approaching, the MBNF may request that the AMF page the UE and send an indication to the UE that the broadcast/multi-cast time is approaching. This page may cause the UE to begin listening to the broadcast/multi-cast. Instead of a page, a trigger may be sent. The trigger may include the information necessary to receive the broadcast (e.g., TMGI, Session ID, etc.).

Figure 17A:
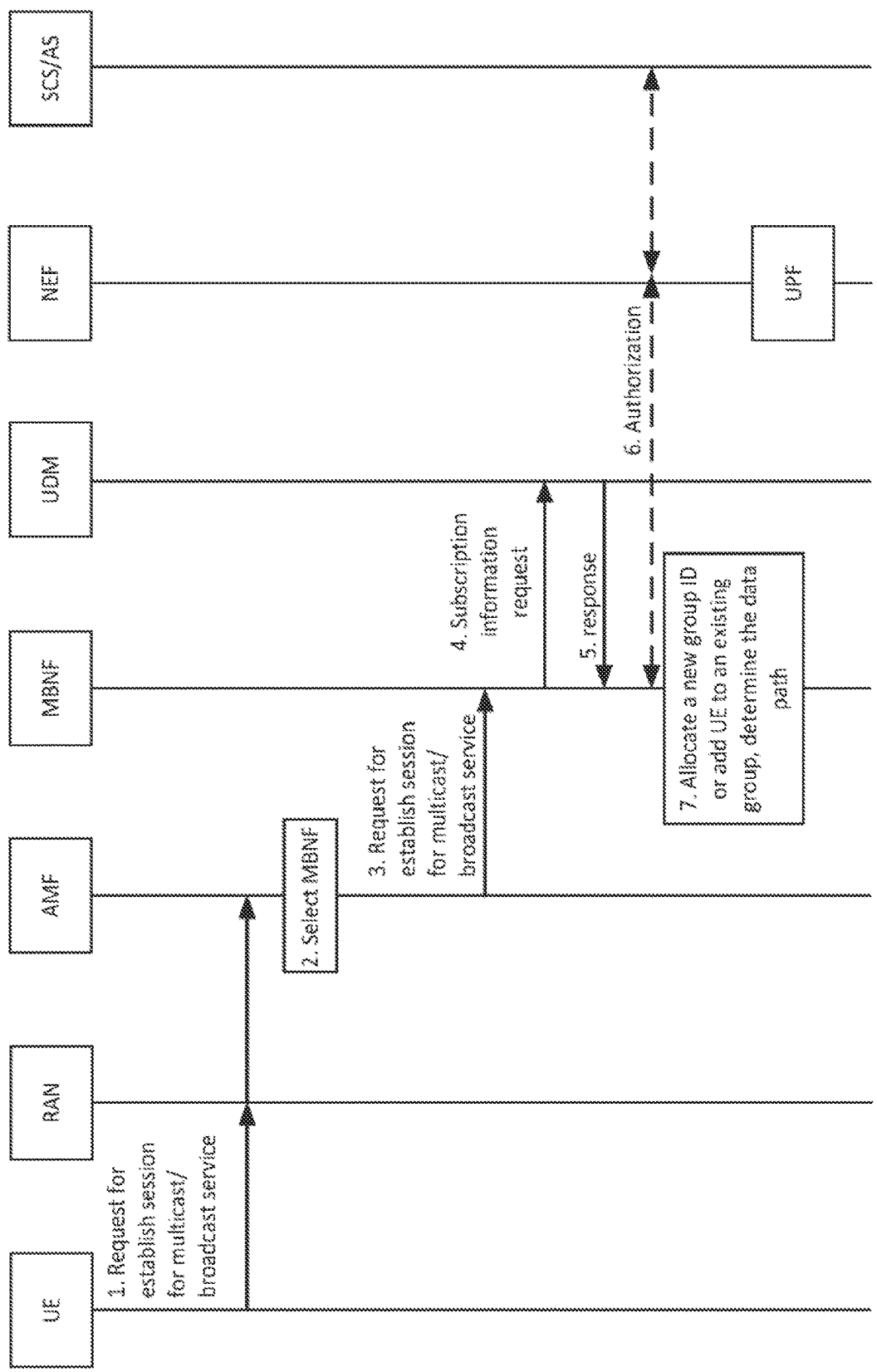
FIGS. 17A-17C show a call flow of an example UE-initiated connection establishment for broadcast/multicast communication.
Figure 17B:
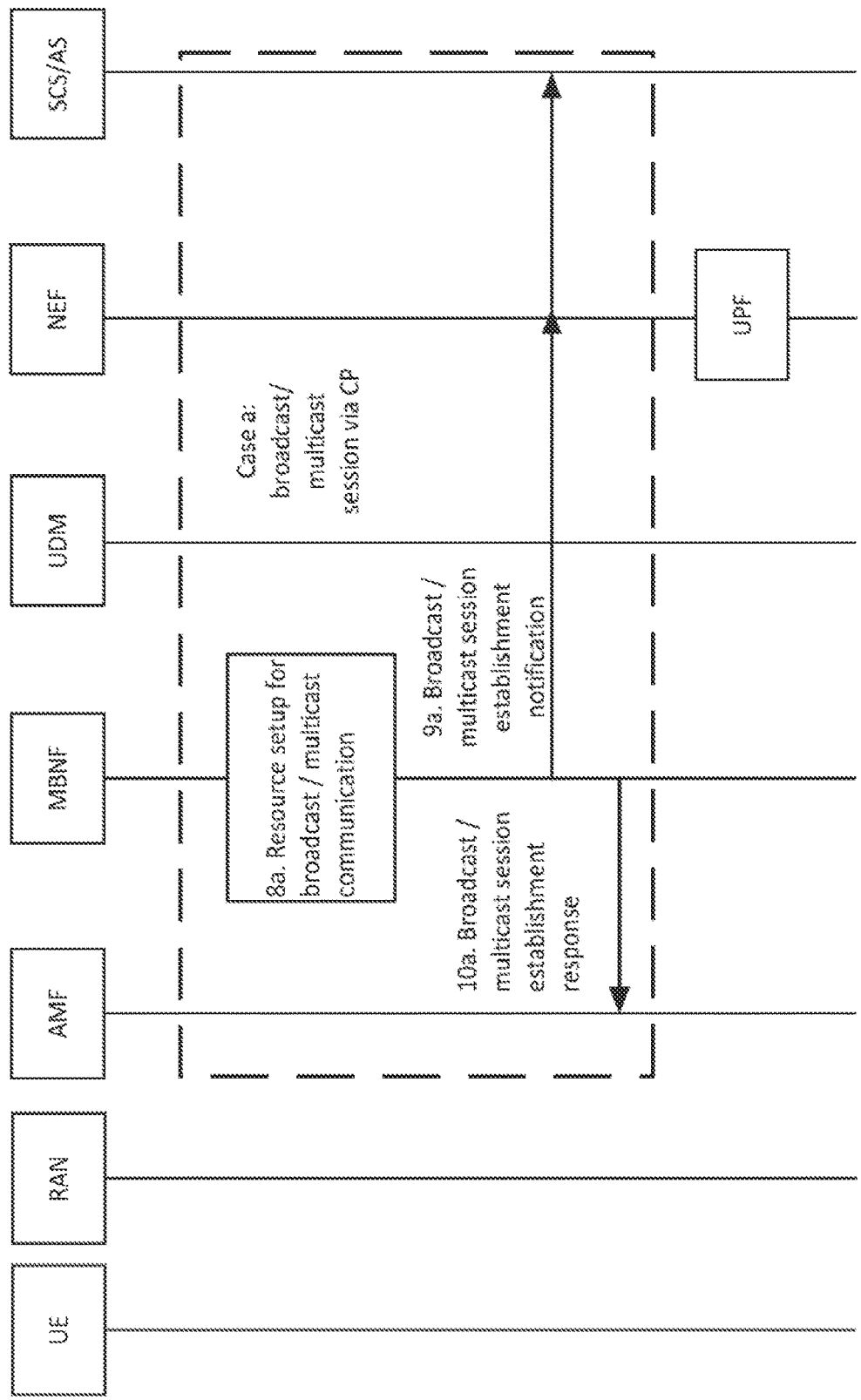
Figure 17C:
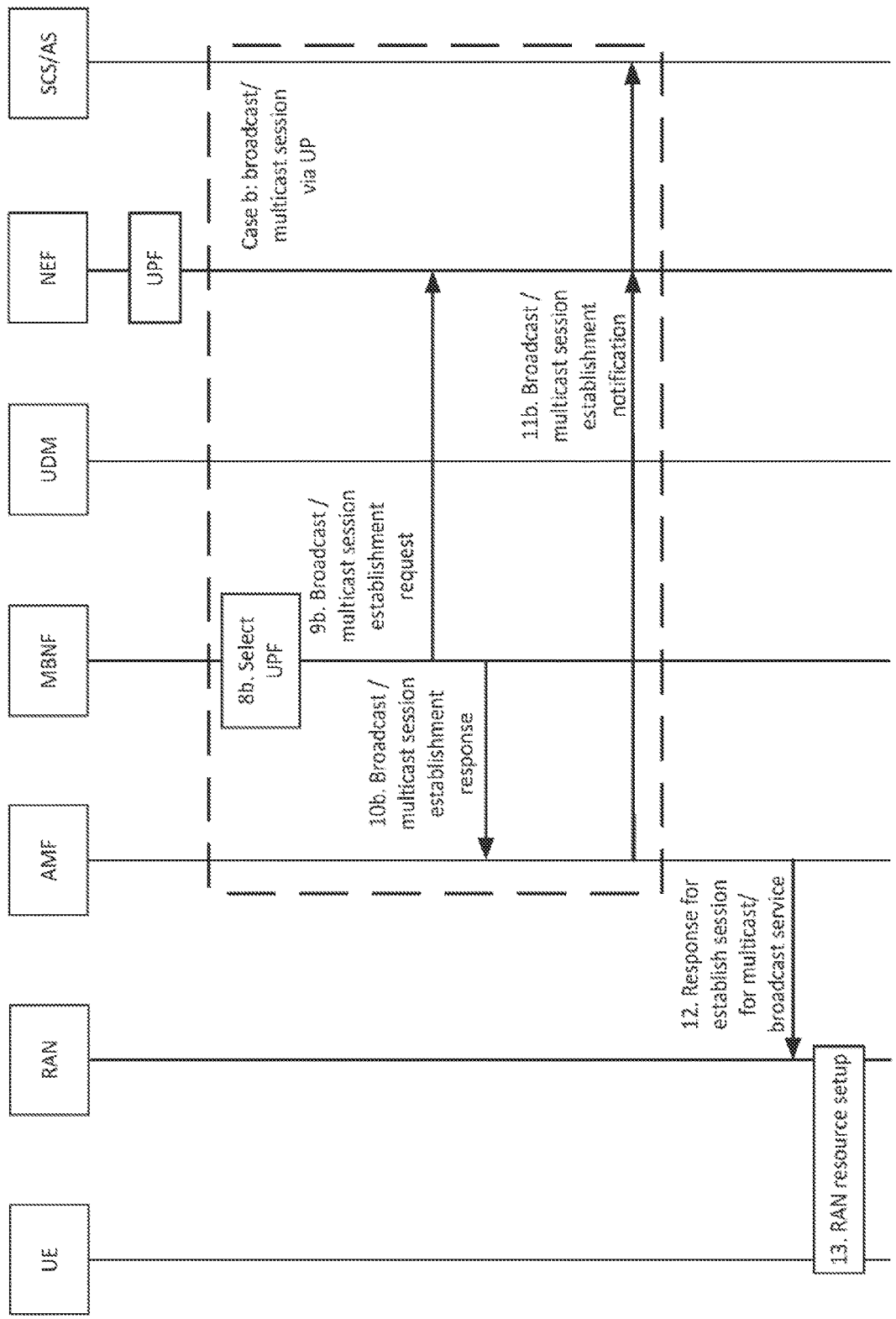

FIGS. 17A-17C show an example procedure for UE-initiated connection establishment for broadcast/multicast which covers both user plane and control plane cases. In FIGS. 17A and 17B, it is assumed that registration is completed.

In step 1 of FIG. 17A, a UE sends request to RAN node and AMF to establish the connection for receiving the broadcast/multicast data. The UE may provide various parameters, such as: MBNF ID for managing the session specifically for broadcast/multicast, which the UE may obtain during the registration process, for example; group ID indicating which group the UE wants to join for receiving the broadcast/multicast data; AMF ID indicating the AMF that is responsible for control signal exchange and data transfer via control plane; application information that the UE wants to receive through broadcast/multicast; type of data for the session, e.g., IP, non-IP or Ethernet, such as the fields that are listed in step 1 of FIG. 16, and; an indication that the network should page group member UE's in advance of the broadcast starting time so that the UEs can receive the information necessary to receive the broadcast (e.g., TMGI); and LADN identifier and service area of LADN if the UE wants to receive data broadcast by a LADN, or UE wants to broadcast its own content through a LADN.

A UE may request to start a broadcast or group communication within a proximity, assuming that the UE is authorized to do so during the registration or process for subscribing the broadcast/multicast service. In other words, the message may not go through the network.

In addition to the information listed above, a UE may further indicate a Source ID to indicate which entity sends out the message. The source ID could be in different forms, such as IP address, 5G-GUTI, SUPI, 5G-TMSI, link layer ID or external ID.

In step 2, upon receiving the request, AMF selects a MBNF if UE does not provide any MBNF ID in step 1. If the network slice connected to the UE has a MBNF, AMF will select this MBNF. Otherwise, the AMF may consider a number of factors for the MBNF selection, such as: the MBNF selected should be a common network function, at least the MBNF is able to serve the network slice connected to the UE; the MBNF is expected to be close to the network slice connected to the UE; the MBNF should have enough resource to serve the UE, or is able to communicate with network entities that are in the network slice connected to the UE, such as AMF, UPF and/or UDM; and the MBNF is able to connect to the SCS/AS which generates the MT data for broadcast/multicast.

In step 3, the AMF sends the request to the MBNF to establish the connection with all information the AMF collects.

In steps 4 and 5, if the MBNF does not have enough information about UE, such as if UE is authorized to subscribe broadcast/multicast service, the UE is allowed to receive broadcast/multicast within which area, for what application or when UE is roaming, MBNF will contact UDM for authorization of the broadcast/multicast communication for the UE.

In step 6, if necessary, MBNF also contacts the SCS/AS, via the NEF, about whether UE is allowed to receive its application data transferred through broadcast/multicast. It is possible that SCS/AS indicates the broadcast/multicast traffic is periodic with a schedule ID. In this case, the PDU session to be established may be shared by multiple (periodic) broadcast/multicast data streams, each of which has different schedules.

In step 7, MBNF decides the data path for broadcast/multicast data, e.g., via control plane path or user plane path. This determination may be based on the content type that provided by the UE, the session ID, or information that was provided by the UDM. The decision is also impacted by the network policy configuration (e.g., operator only supports broadcast/multicast via AMF over control plane), UE capability (e.g., UE does not support broadcast/multicast over control plane), and the SCS/AS setup (e.g., the application data provider prefer the control plane broadcast/multicast). In addition, MBNF will either allocate a new group ID for the broadcast/multicast service to the UE, or add the UE to an existing group. This depends on whether there is an existing group that transfer application data matching what the UE looks for, and if the data path meets all the requirements. The MBNF will also create a charging recording to note that the UE has requested the broadcast.

The call flow of FIG. 17A continues in FIG. 17B, where, in a first case a session is created over Control Plane via AMF.

In step 8a of FIG. 17B, upon making the decision to provide the broadcast content via NAS messaging, MBNF will setup the resource of the connection for broadcast/multicast. In other words, MBNF may estimate how many UEs are involved, and how frequent the broadcast/multicast take place, and notify AMF about this information so that AMF knows about the resource for broadcast on top of the NAS signal.

In step 9a, MBNF notifies the NEF about the broadcast/multicast connection, and NEF further notifies the SCS/AS. In the message, MBNF may include the session ID, AMF ID, MBNF ID, and group ID in the message, as well as the UE identification, SCS ID and application information that is for broadcast/multicast. If the MBNF is contained in a network slice, e.g., MBNF is not a common network function, the network slice identification is also included.

In step 10a, the MBNF sends a response message to AMF about the session establishment for broadcast/multicast. Besides the information mentioned in step 9a, MBNF may also include the additional information in the message to AMF, such as NEF ID and connection identification used for carrying the MT broadcast/multicast data between MBNF and AMF (e.g., NAS-SM-Multicast/Broadcast signal as shown in FIG. 14). Content can then be broadcast over the control plane. The MBNF may also indicate that the session is established for a periodic traffic with a schedule ID. The UE may have a connection via control plane before establishing this second connection via control plane for only receiving broadcast/multicast data. The first connection may be for NIDD as an example.

In a second case, the call flow of FIG. 17A continues in FIG. 17C, where a session is created over a User Plane.

In step 8b of FIG. 17C, in the case that the data is broadcast/multicast via user plane, and MBNF would select a UPF as the anchor point. The UPF must support the broadcast/multicast capability, e.g., UPF is able to identify which RAN nodes it needs to communicate for the broadcast/multicast data and broadcast/multicast the MT data to those RAN nodes once. Other factors may be taken into account, e.g., if a UPF supports broadcast/multicast communication for non-IP data.

In step 9b, the MBNF requests the selected UPF to create a session for broadcast/multicast service. The request message includes the group ID, session ID, UE ID and SCS ID. MBNF may also indicate if data buffering is enabled or not for the broadcast/multicast MT data. The MBNF may also indicate what RAN, or N3IWF, nodes the UPF should forward this broadcast information to. Note that, if the MBNF does not need to be aware of the UEs that are receiving broadcast, the MBNF might only execute this step when the broadcast is configured for a first UE in the group and not when the broadcast is configured for subsequent UEs in the group.

In step 10b, the MBNF also notifies AMF and/or RAN nodes about the session establishment with the selected UPF. UPF ID is included. MBNF may also indicate if data buffering is enabled or not for the broadcast/multicast MT data.

In step 11b, the AMF sends some additional information to UPF so that UPF is able to figure out which set of RAN nodes it needs to contact when the MT data is arrived for broadcast/multicast. This information may include the broadcast/multicast area information regarding the session for the UE, the IDs of RAN nodes for creating tunnels between UPF and each RAN node.

The call flow for both the cases FIGS. 17B and 17C concludes in steps 12 and 13 of FIG. 17C.

In step 12, of FIG. 17C AMF notifies the RAN node about the session established for broadcast/multicast with session ID, broadcast/multicast area, and UPF ID if the data will be transferred via user plane, and group ID along with the UE ID.

In step 13, the RAN node communicates with UE to setup the RAN resource, and let UE know the session ID and group ID for broadcast/multicast service. The RAN nodes may contact the UE via paging. Alternatively, the AMF, MBNF, or SCS/AS may provide this information to the UE. Content can then be broadcast over the control or user plane. The message to the UE may indicate information that the UE will use to establish a special N1 interface to the AMF. This special N1 interface will be used only to receive data and can be used by multiple UEs to receive the same data.

Note, it is possible that the AMF or MBNF adds the UE into a group, which already has a session established for broadcast/multicast. In that case, the procedure stops at step 2 or step 7.

The network initiated session establishment process may be triggered by the arrival of MT broadcast data, lack of broadcast connection to one or more UEs in the group, or configuration request from service provider (e.g., SCS/AS). The AF, MBNF, NEF, or UPF may initiate the process. The steps are similar to steps 4~13, which is triggered by one of the events discussed above.

If an AS or AF requests the creation of a connection for broadcast communication, the AS or AF may provide the group ID (e.g., TMGI) if any, location information for the group communication (e.g., service area, registration area/tracking area, geographic location), data transfer schedule (e.g., starting time, end time), and/or QoS of the data (e.g., data rate and/or latency). Once NEF receives the request from AS or AF, it will forward the request to MBNF or SMF if MBNF is implemented as a part of SMF. MBNF will assign an ID if a group ID is not created yet for the broadcast. MBNF will also select an AMF to communicate with the RAN node for setting up resource for the group communication. MBNF may select the AMF based on the location information provided by the AS or AF. If the data is broadcast through the user plane, MBNF will also select a UPF as the anchor point for the connection. Once the selected AMF gets the information from MBNF or SMF, AMF will select and contact the RAN node for the coming broadcast communication. There could be more than one RAN nodes involved for the broadcast.

Mechanisms of broadcast/multicast of mobile terminated (MT) data to UEs may encompass use of a control plane via AMF over the NAS-MM signaling and use of a user plane via UPF.

Note that, the data may be originated from SCS/AS or some network functions within the 5G network such as network data storage function (DSF). For example, multiple UEs are interested in the same data stored in the DSF. Once the new data comes in, the DSF may broadcast the new data to those UEs. The methods described herein work for both IP data type and non-IP data type (e.g., non-structured data).

Figure 18A:
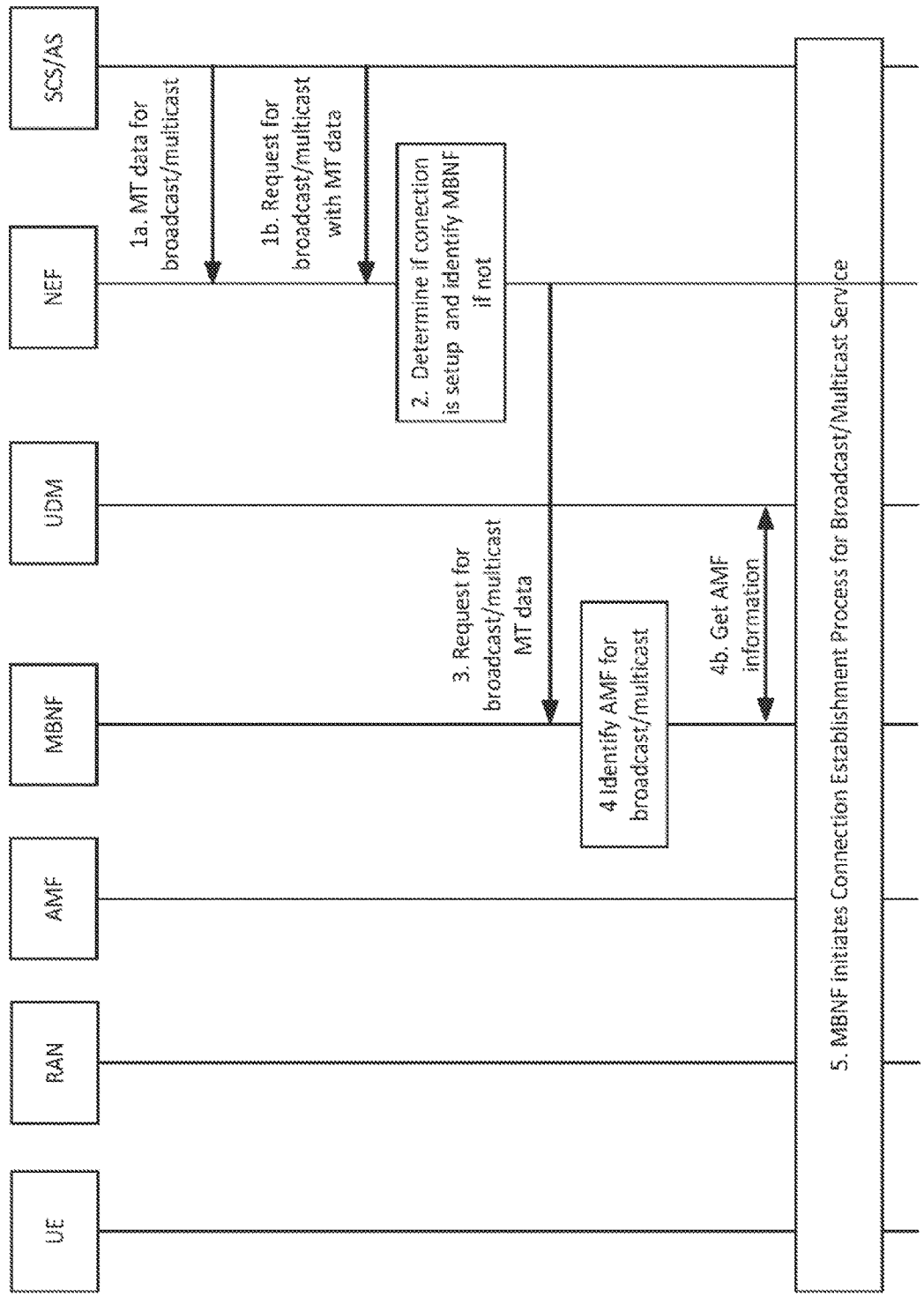
FIGS. 18A and 18B show a call flow of an example MT data broadcast/multicast via control plane.
Figure 18B:
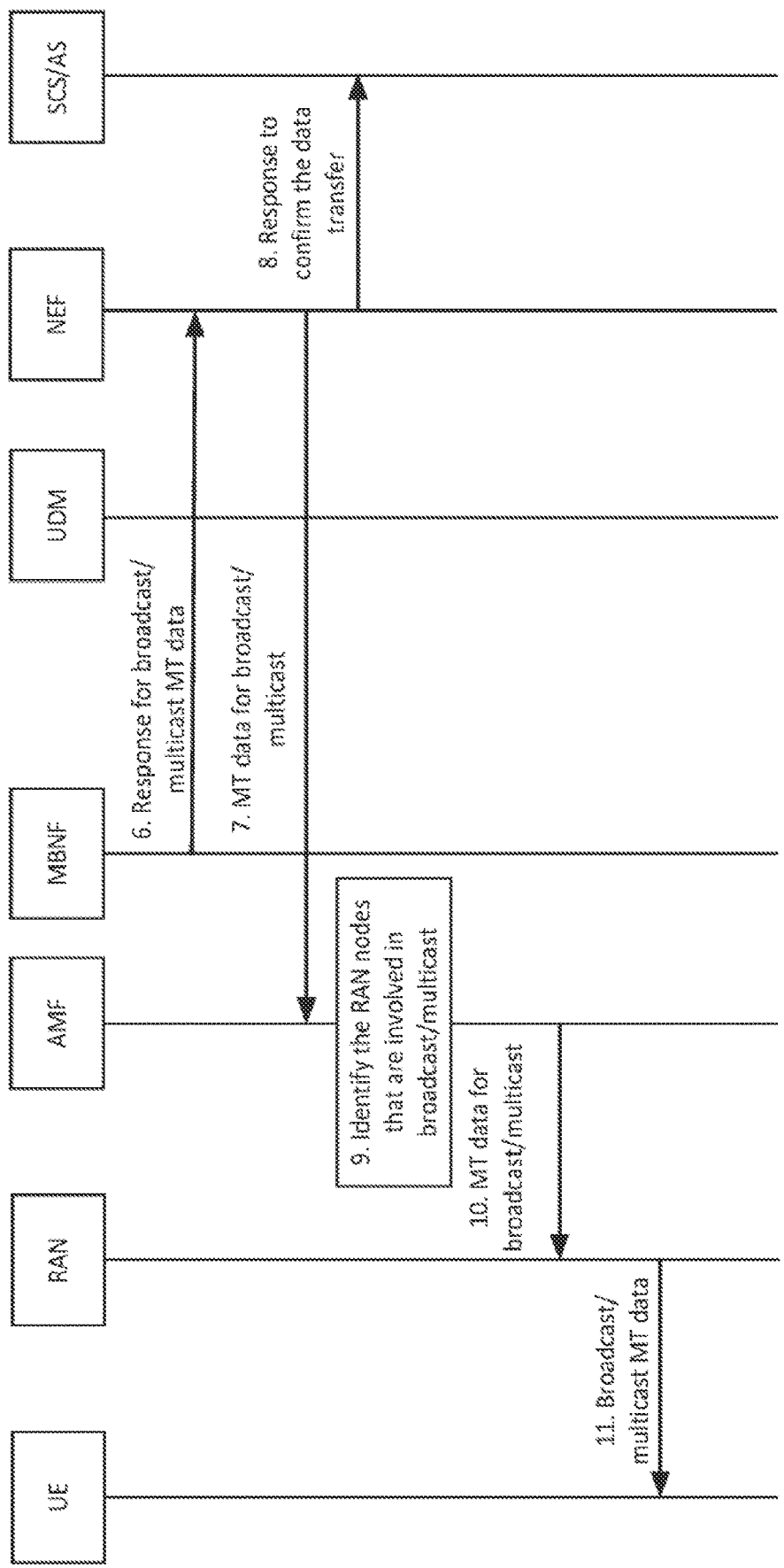

Broadcasting or multicasting data may be achieved over a control plane path, e.g., via AMF on top of NAS-MM signal. Optionally, MBNF may or may not be involved in the data transfer. FIGS. 18A and 18B show an example call flow to broadcast/multicast the MT data via control plane, e.g., via AMF.

In step 1a of FIG. 18A, an application server (AS) sends the mobile terminated (MT) data to NEF for broadcast/multicast in case that the group is already formed, and the group ID is assigned by the MBNF. The following information may be provided in the message: a Group ID (e.g., TMGI) that includes the targeted UEs; SCS/AS ID; MBNF ID representing the MBNF that is managing the group; a Session ID representing the connection established by MBNF for broadcast/multicast if the connection is already created; an AMF ID in case that the NEF may not be aware of the AMF on the control plane path of the connection for the broadcast/multicast; and S-NSSAI (Single Network Slice Selection Assistance information), which identifies a network slice (instance) that is involved in the broadcast/multicast, in case that the MBNF and/or AMF is a common function serving several network slices. In this scenario, the MBNF ID or AMF ID may imply such information, or another parameter is used to indicate this information. If the traffic is periodic, a schedule ID is included to identify the periodic traffic.

A source ID of the broadcast/multicast message may be used to indicate the entity originating the data.

In step 1b, if the group is not formed yet, the AS may send a request for broadcast/multicast MT data attached in the request message. In addition to information discussed in step 1a, additional parameters may include IDs of destination UEs and an external group ID.

In step 2, NEF may check if the session is established or if the group is created based on the step 1 message. If either of these two information is missing, NEF will go to step 3 by sending MBNF a request to establish a session and/or create a group.

Steps 3 to 6 are optional in the case that the session or group is not created.

In step 3, NEF sends MBNF a request to establish a session and/or create a group. The request message includes the information NEF gets from step 1.

In step 4, the MBNF identifies the AMF that is responsible for reaching the targeted UEs through NAS signaling. MBNF may achieve this, for example, where AMF ID is given in the request message, or where AMF ID is obtained by contacting UDM based on the network slice information (e.g., S-NSSAI) as well as the UE information (e.g., UE IDs) as shown in Step 4b.

In step 5, the MBNF initiates the procedure for establishing a session for broadcast/multicast as shown in FIGS. 17A to 17C. The outcome is the session ID and group ID created for the broadcast or multicast MT data transfer requested by SCS/AS.

In step 6 of FIG. 18B, the MBNF sends the response to NEF with the outcome of session establishment procedure. The response may include the following information: Session information; AMF address; Group ID; and Network slice instance that serves the UEs in the group, there may be multiple AMFs for reaching the target UEs in the group. UEs in the group may be served by different network slice instance, but by the common MBNF and/or AMF.

In Step 7, NEF sends the MT data to AMF that serves as the NAS signaling anchor for reaching the UE. NEF may indicate if AMF is required to page the UE for receiving the MT data in case that UE is in IDLE state. This indication may be pre-configured in network, or configured by the SCS/AS in the message sent during step 1.

Optionally, the data may be passed through MBNF, which forwards it to AMF. In this scenario, NEF needs only to know the MBNF that is responsible for the broadcast/multicast, and MBNF will store the session information, group information, and AMF address for data transfer.

In step 8, NEF sends a response to SCS/AS to confirm the MT data transfer. Optionally, NEF may also include the session information and group information in the message.

In step 9, upon receiving the MT data, AMF identifies the RAN nodes to reach the UEs. It is possible that multiple RAN nodes are needed to reach the UEs in the group. AMF may achieve this by managing the mobility status report from UEs.

In step 10, AMF broadcasts/multicasts the MT data to one or more identified RAN nodes. This broadcast content may be sent over a special N1 connection that can be listened to by more than one UE. This N1 connection may be such that recipients of the N1 message never respond. Thus, the UE's that listen to this N1 connection might have 2 N1 connections to the AMF. One connection for normal N1 interaction with the AMF and the other for listening to broadcast information. This broadcast N1 interface between the UE and AMF may have a name that is different than N1. Content that is sent on this interface may be encrypted based on an encryption function that is based on the group identifier, AMF identifier, MBNF identifier, session identifier, or a value that was provided by the content provider (SCS/AS).

In step 11, RAN node broadcasts/multicasts the MT data, which includes the group ID so that a UE is able to determine whether it is the target or not.

Figure 19:
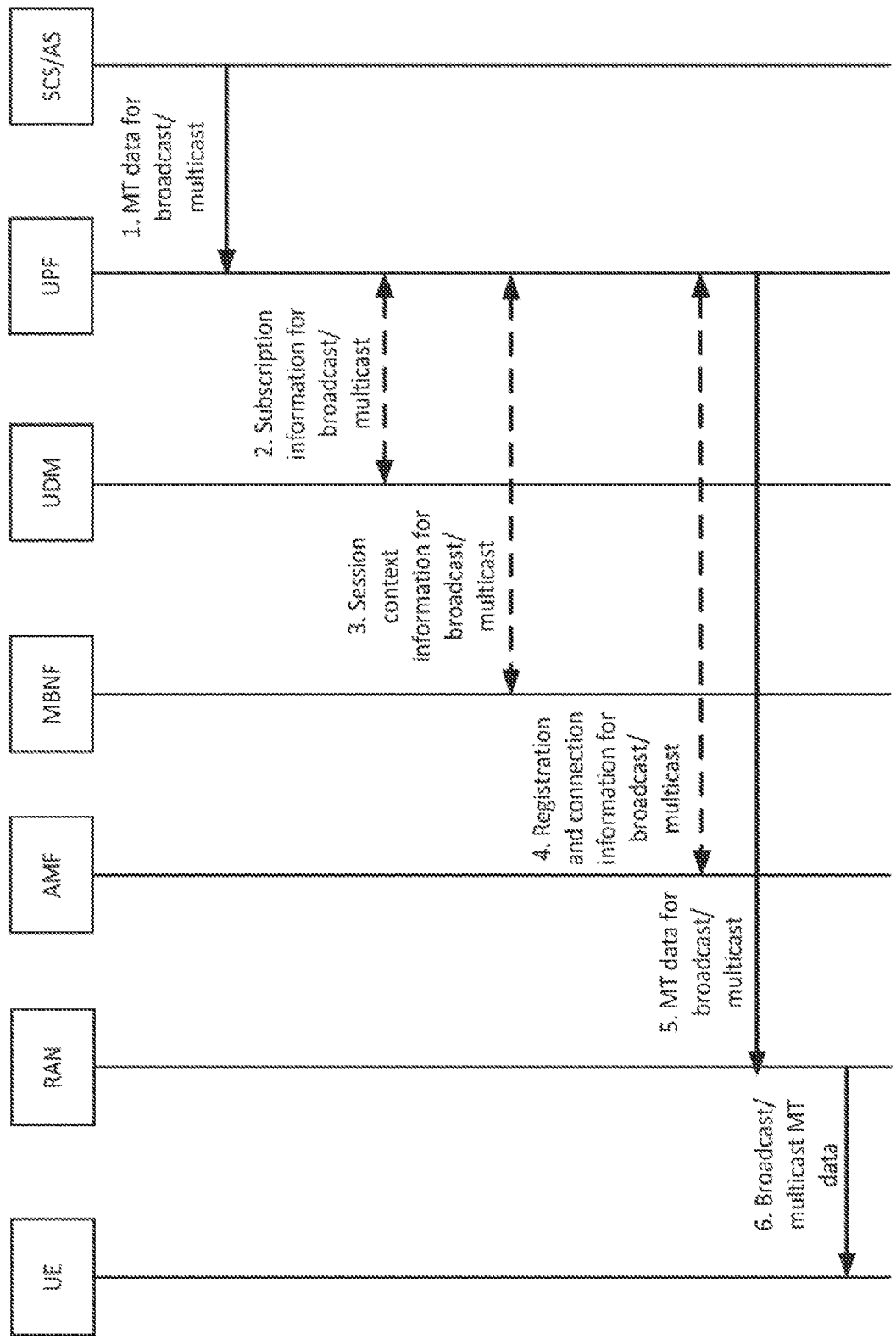
FIG. 19 shows a call flow of an example MT data broadcast/multicast via user plane.

FIG. 19 shows an example procedure for the broadcast/multicast of MT data via user plane path, e.g., via UPF In step 1 of FIG. 19, the SCS/AS sends the MT data to be broadcast/multicast to an anchor UPF.

In step 2, the UPF may contact the UDM for more subscription information or context information related to the broadcast/multicast. For example, if an external group ID is given by SCS/AS, UPF may request the corresponding group ID and session ID from UDM.

In step 3, the UPF may contact the MBNF for more session context information if UPF does not have enough session information. For example, the QoS associated with the session for broadcast/multicast, or if any UE joins or leaves the group.

In step 4, the UPF may contact AMF for mobility management information about UEs and RAN nodes if necessary. For example, if any UE included in the group change the RAN node it associates with, or in case that a new UE joins the group, what the RAN node it associates with.

In step 5, the UPF broadcast/multicast the MT data to one or more RAN nodes. It is possible that UPF does not have any connection with a RAN node before, thus UPF may initiate the procedure to create N3 connection, or UPF simply forwards the MT data to AMF, and AMF will be responsible for broadcast/multicast MT data to RAN nodes.

In step 6, a RAN node broadcasts/multicasts MT data to UEs. RAN node may only include the group ID (e.g., TMGI) in the message without any UE ID, so that any UE that is listening to broadcast will get the data. The RAN node may also include the session ID to identify the connection established for a broadcast/multicast application data, so that all the UEs that share the session will get the data. In case that the broadcast is served by a dedicated network slice, the slice ID may be included in the message as well. The MBNF ID may also be included in case MBNF's are allowed to use the same group IDs.

A UE may want to broadcast its content within a small area via a LADN. For example, one possible use case is the local advertisement, where the advertisement is only valid within a local area. In such a case, a UE may subscribe the broadcast/multicast service and establish the PDU session, for example, according to registration methods of FIGS. 15A to 15D and connection establishment methods of FIGS. 17A to 17C. In addition, the UE may request network to buffer the broadcast/multicast data. When data arrives, UE sends the data to AMF via NAS message. In the message, UE may indicate the session ID, LADN identifier, and broadcast schedule for its data content. Then, AMF will check if UE is in the service area of the LADN, and if UE is allowed to broadcast its data within the area covered by the LADN. AMF may complete these verifications with the assistance of SMF, UDM, MBNF and/or LADN DNN. It is possible that UE is able to broadcast its data even if the UE is out of service area of LADN. This depends on the configuration when UE subscribes the broadcast service provided by the core network and LADN.

Moreover, since the broadcast is valid only within the service area of the LADN, a group identifier may not be needed. For example, an LADN identifier and application identifier may be used to identify the broadcast traffic. In other words, the UEs within the LADN and interested in the application will listen to the broadcast, and be able to receive the data.

The UE may want to broadcast the data periodically through the LADN. For example, broadcast the latest measurements within the LADN every one hour. In this scenario, UE could indicate to the network in the request message when it subscribes the broadcast service, or when it requests to establish PDU session for the broadcast. Network may assign a schedule ID for this type of broadcast traffic, so that the scheduling ID can be used to identify the broadcast traffic in the future.

The control plane may be preferred for this kind of the broadcast via a LADN for the UE, since AMF needs to check if UE is in the service area of the LADN.

An update to an existing session for broadcast/multicast communication may be triggered, e.g., by an AS or AF, in a number of situations. For example, if some UEs in an existing group move to a new area, this may require that a new AMF or new RAN node broadcast the application data. Correspondingly, some RAN nodes or AMF may not be needed any more for the group communication. Similarly, and AS or AF may trigger and update if QoS of the application data is changed, and/or the schedule of the broadcast for group communication is changed.

A network may also initiate an update to a connection for broadcast/multicast communication. For example, a network may wish to do so due to the scale up/down of involved NFs, and/or when congestion control or load balancing occurs at the involved NFs.

To effect an update, a request may be sent to the MBNF to modify the connection for the group communication from AF/AS or NFs. In the request message, the changed attributes may be included as well as the ID of the connection, e.g., TMGI. If the AMF or RAN node needs to be changed, the MBNF will select a new AMF, and new RAN node will be contacted by the new AMF. This selection may be mainly based on the location information. The corresponding session parameters may be provided to the new RAN node by the new AMF. Moreover, the old AMF and the RAN nodes may be notified to stop the group communication for the specific group ID, e.g., TMGI.

RAN nodes may contact the UE via paging and the MME, or SCS/AS may provide the information necessary to receive the broadcast to the UE. Content can then be broadcast over the control or user plane as described below. The message to the UE may indicate information that the UE will use to establish a special S1-MME interface to the MME. This special S1-MME interface will be used only to receive data and can be used by multiple UEs to receive the same data.

Figure 20A:
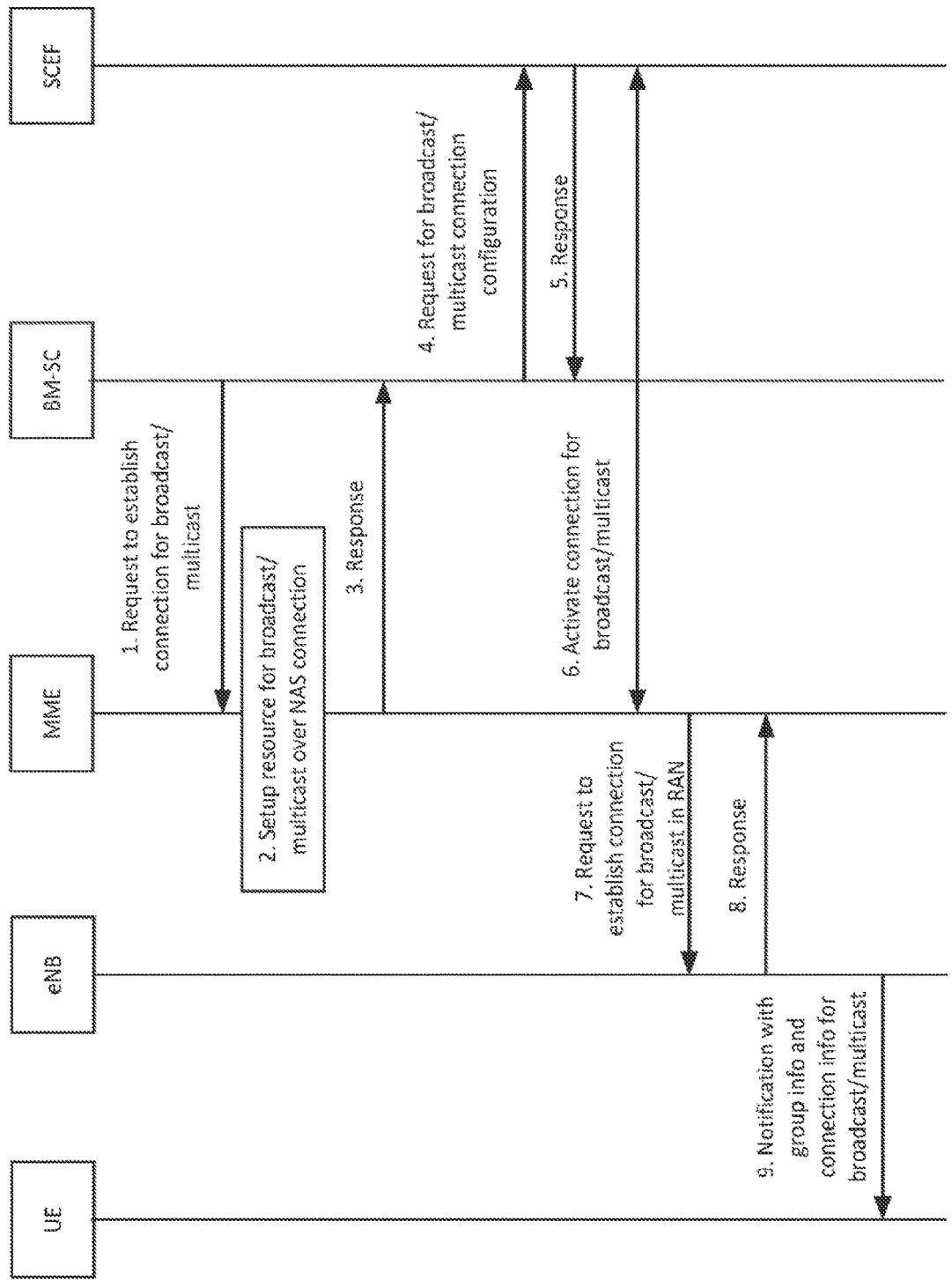
FIGS. 20A and 20B show a call flow of an example broadcast/multicast via control plane in EPC.
Figure 20B:
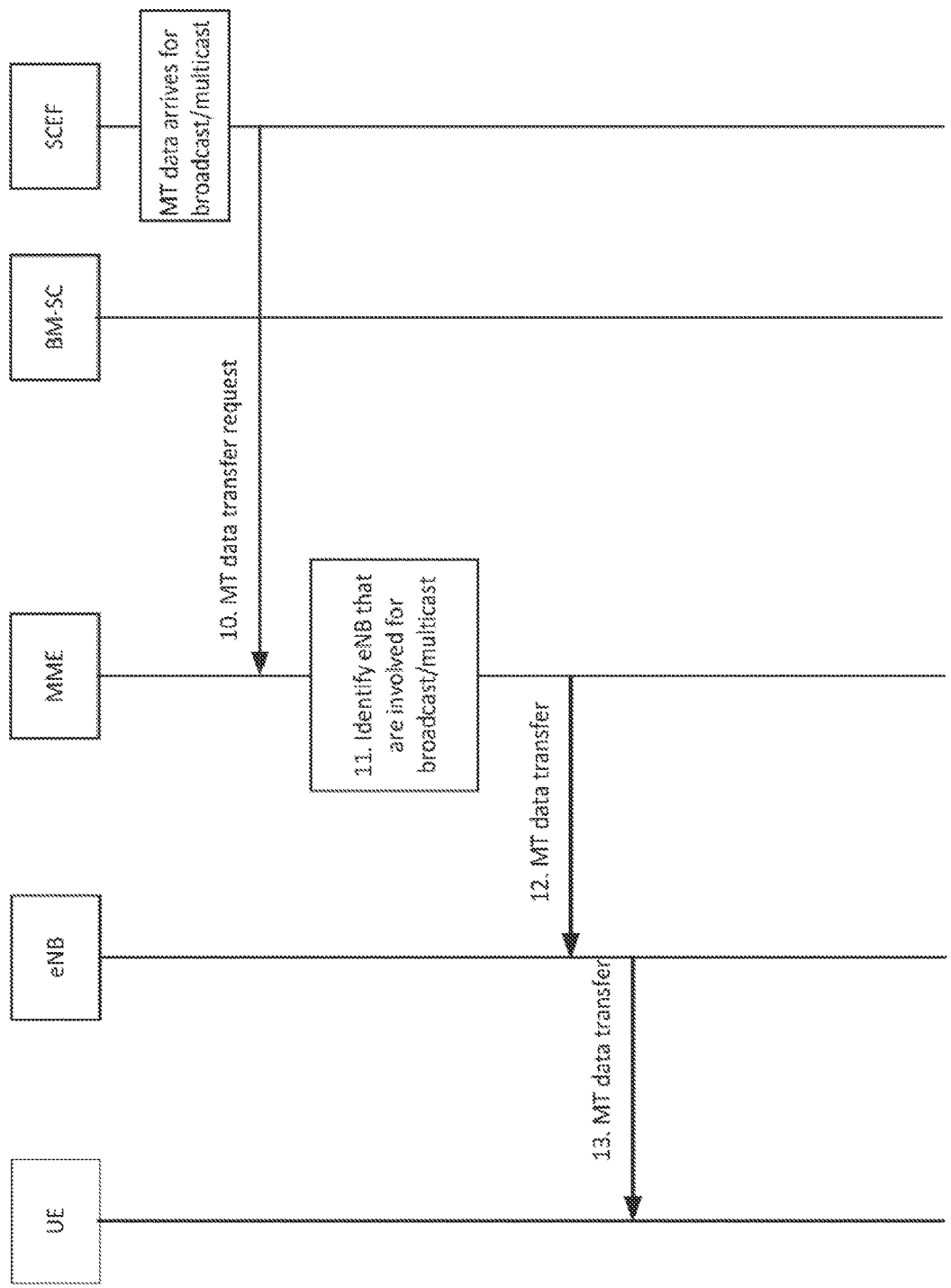

Example mechanisms to enable broadcast/multicast MT data through control plane in EPC are shown in FIGS. 20A and 20B. FIG. 20A illustrates connection setup. FIG. 20B illustrates data transfer via the control plane by multicast/broadcast.

In step 1 of FIG. 20A, BM-SC sends request to MME for establishing a session for broadcast/multicast. This may be triggered by a request from SCS/AS, via the SCEF, or UE. In the request to MME, BM-SC may include SCEF ID, SCS/AS ID and the corresponding application information. If group ID is available, BM-SC also includes that in the request. Based on the policy, BM-SC may indicate if roaming is supported and if data buffering is enabled for the broadcast/multicast session.

In step 2, MME sets up the resource for the broadcast/multicast session, and figures out which eNBs it needs to contact for broadcast/multicast. Particularly, data will be transferred on top of S1AP signal between MME and eNB. MME may determine the eNB by keeping the UE's location (e.g., in terms of TAI or cell). If MME does not know which UE is in the group, MME may resort to HSS by passing the group ID to the HSS.

In step 3, MME sends the response to BM-SC to confirm the session establishment, with the parameters such as session ID and S1AP connection information.

In step 4, upon receiving the response from MME, BM-SC further contacts SCEF about the broadcast/multicast session with MME ID, session ID and possible group ID information.

In step 5, SCEF replies to the BM-SC about the configuration completion.

In step 6, SCEF further contacts MME to activate the broadcast/multicast session, with SCEF ID and T6a connection information between SCEF and MME.

In step 7, MME then requests eNB(s) to setup resource for the broadcast/multicast session. One or more eNBs may be involved. In the message, MME may include the broadcast/multicast service area information, so that each eNB may validate the coverage of UEs in the group.

In step 8, eNB replies MME about the resource configuration.

In step 9, eNB notifies each individual UE about the group ID for broadcast/multicast, and sets up the RAN resource for the data transfer.

In step 10 of FIG. 20B, when the MT data arrives at SCEF, it identifies the responsible MME and the session for broadcast/multicast. SCEF forwards the data to MME with group ID (e.g., TMGI), session ID, SCEF ID and SCS/AS ID. This step may comprise the SCS/AS sending data to the SCEF as described in section 5.3.5 of 3GPP TS 23.682, Architecture enhancements to facilitate communications with packet data networks and applications, v15.1.0

In step 11, MME determines which eNB it needs to forward the data to. For example, MME may maintain an internal mapping between group ID and a list of eNBs or this information may be provided by the SCEF.

In steps 12 and 13, MME sends the MT data to one or more eNBs, which further broadcast or multicast the data with group ID. This message may be sent over a special S1-MME interface that can be listened to by more than one UE. This S1-MME connection may be such that recipients of the S1-MME message never respond. Thus, the UE's that listen to this S1-MME connection might have 2 S1-MME connections to the MME. Once connection for normal S1-MME interaction with the AMF and the other for listening to broadcast information. This broadcast S1-MME interface between the UE and MME may have a name that is different than S1-MME. Content that is sent on this interface may be encrypted based on an encryption function that is based on the group identifier, MME identifier, session identifier, or a value that was provided by the content provider (SCS/AS).

Figure 21:
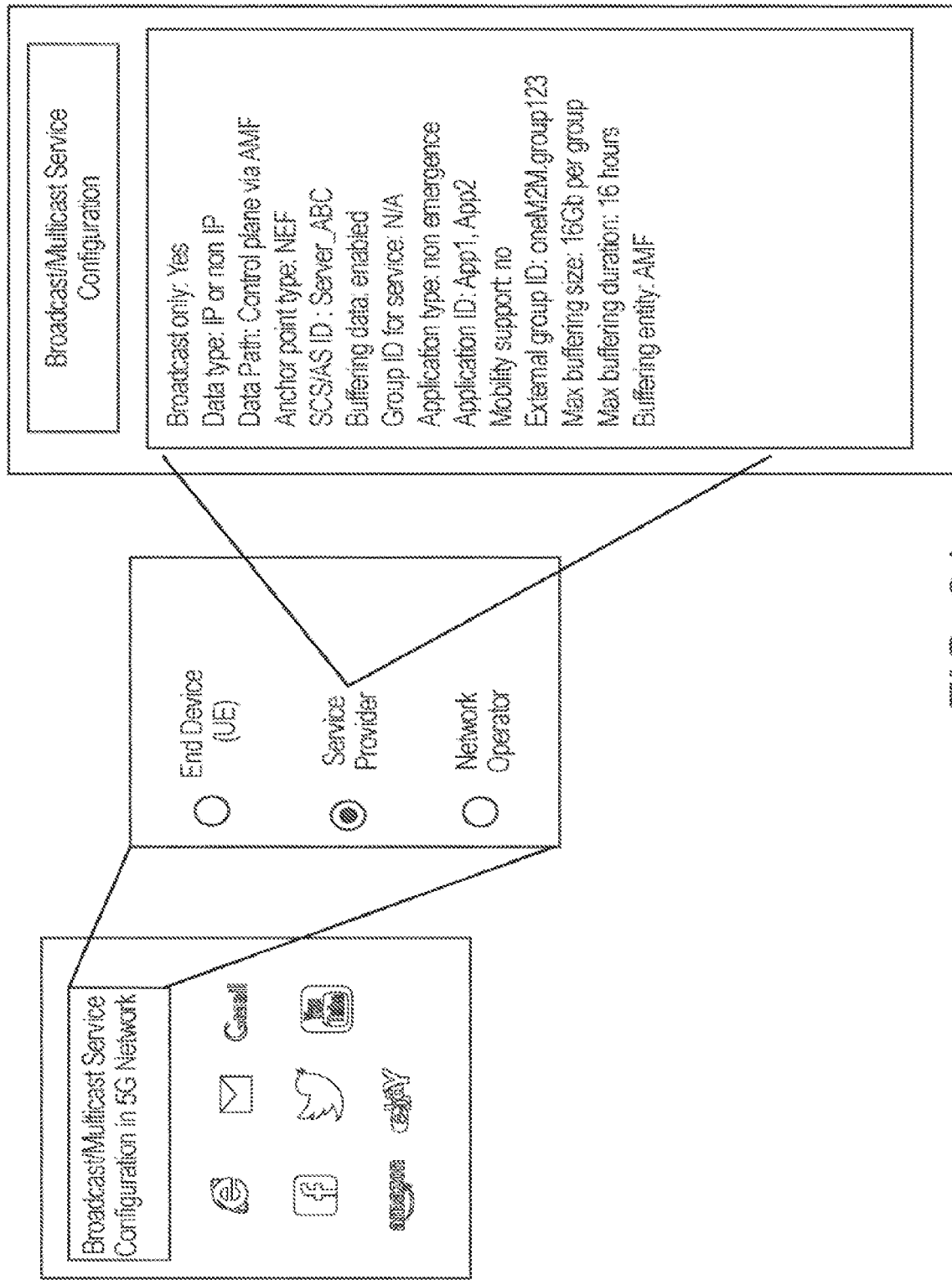
FIG. 21 shows an example user interface for configuring broadcast/multicast service in a 5G network.

FIG. 21 shows an exemplary user interface for configuring the broadcast/multicast service in 5G network. The user interface may be used by end device (UE), service provider (SCS/AS), as well as the network operator.

Figure 22:
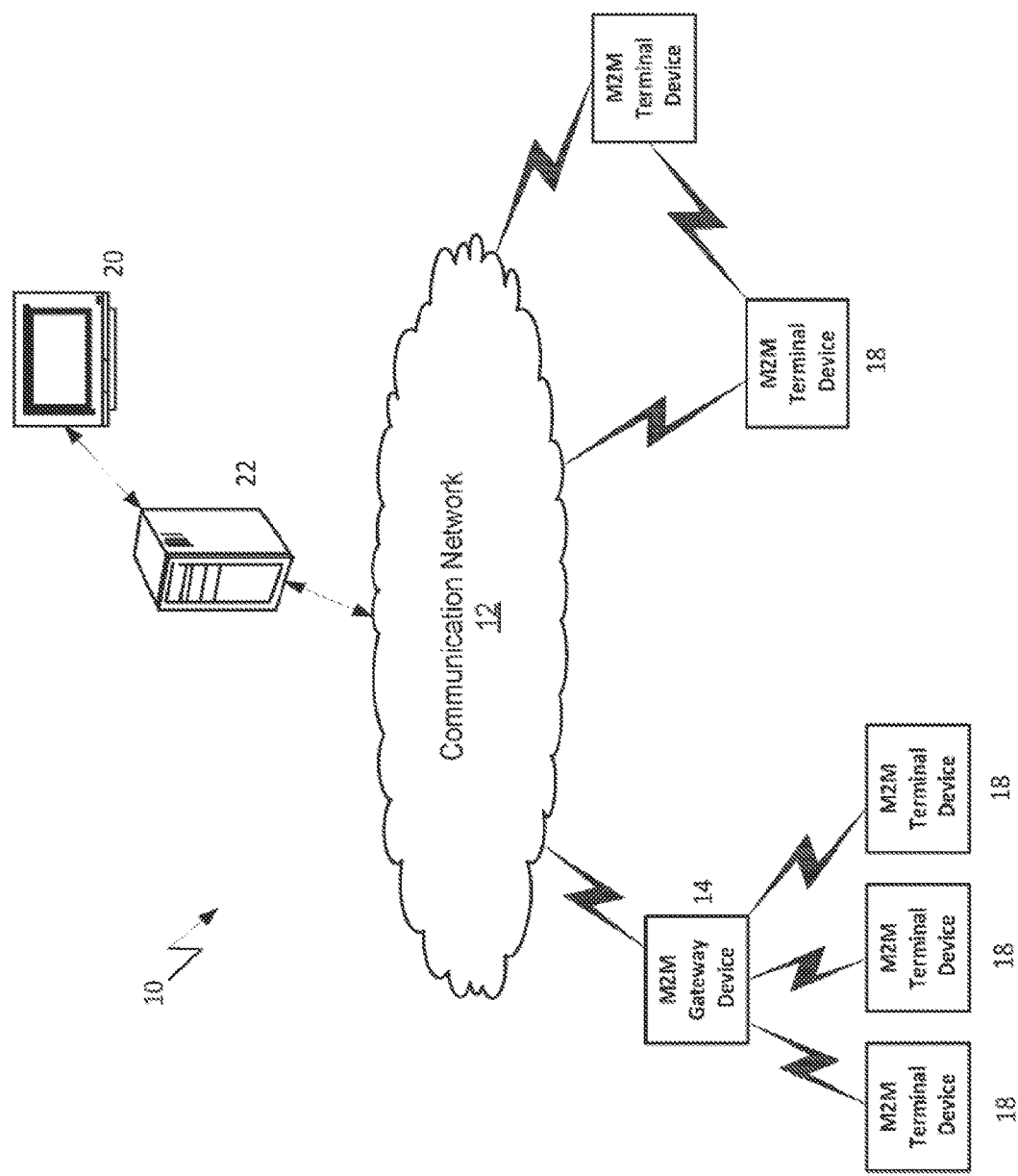
FIG. 22 is a system diagram of an example machine-to-machine (M2M), Internet of Things (IoT), or Web of Things (WoT) communication system in which one or more disclosed embodiments may be implemented.

FIG. 22 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 1-14, 15A-15D, 16, 17A-17C, 18A-18B, 19, 20A-20B, and 21-25 may comprise a node of a communication system, such as the ones illustrated in FIGS. 1-14, 15A-15D, 16, 17A-17C, 18A-18B, 19, 20A-20B, 22 and 23.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 22, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 22, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 23:
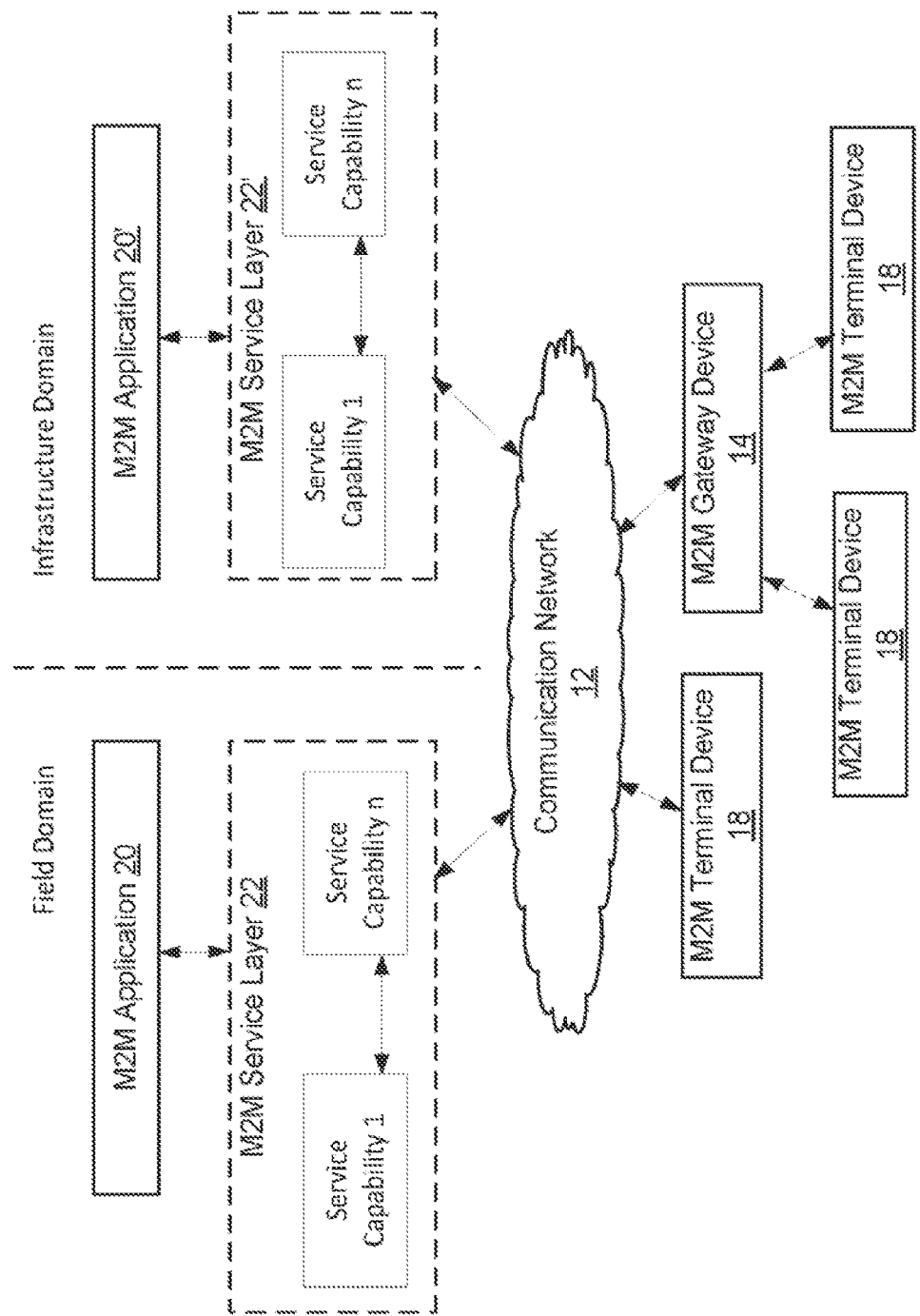
FIG. 23 is a system diagram of an example architecture that may be used within the M2M/IoT/WoT communications system illustrated in FIG. 22.

Referring to FIG. 23, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 23, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 23, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS).

Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 24 or FIG. 25 described below.

Further, the methods and functionalities described herein may be implemented as part of an M2M network that uses a Service Oriented Architecture (SOA) and/or a Resource-Oriented Architecture (ROA) to access services.

Figure 24:
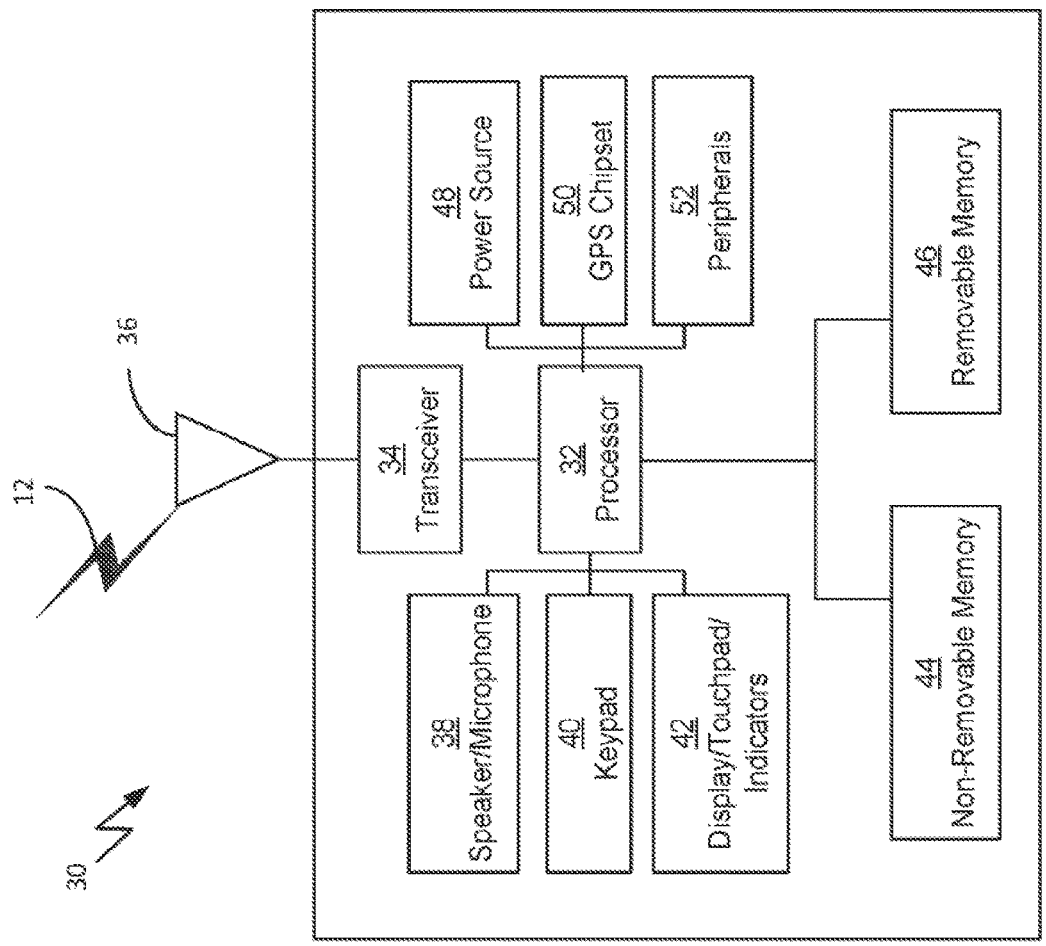
FIG. 24 is a system diagram of an example communication network node, such as an M2M/IoT/WoT device, gateway, or server that may be used within the communications system illustrated in FIGS. 22 and 23.

FIG. 24 is a block diagram of an example hardware/software architecture of a node of a network, such as one of the clients, servers, or proxies illustrated in FIGS. 1-14, 15A-15D, 16, 17A-17C, 18A-18B, 19, 20A-20B, and 21-25, which may operate as an M2M server, gateway, device, or other node in an M2M network such as that illustrated in FIGS. 1-14, 15A-15D, 16, 17A-17C, 18A-18B, 19, 20A-20B, 22 and 23. As shown in FIG. 24, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements multicast and broadcast services methods described herein, e.g., in relation to the methods described in reference to FIGS. 2, 3, 5-7, 15A-15D, 16, 17A-17C, 18A-18B, 19, and 20A-20B or the data structures of any of FIGS. 11-14 and 21, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 24, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the multicast and broadcast services methods described herein, e.g., in relation to FIGS. 2, 3, 5-7, 15A-15D, 16, 17A-17C, 18A-18B, 19, and 20A-20B, or in a claim. While FIG. 24 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 24 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M Service Layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 25:
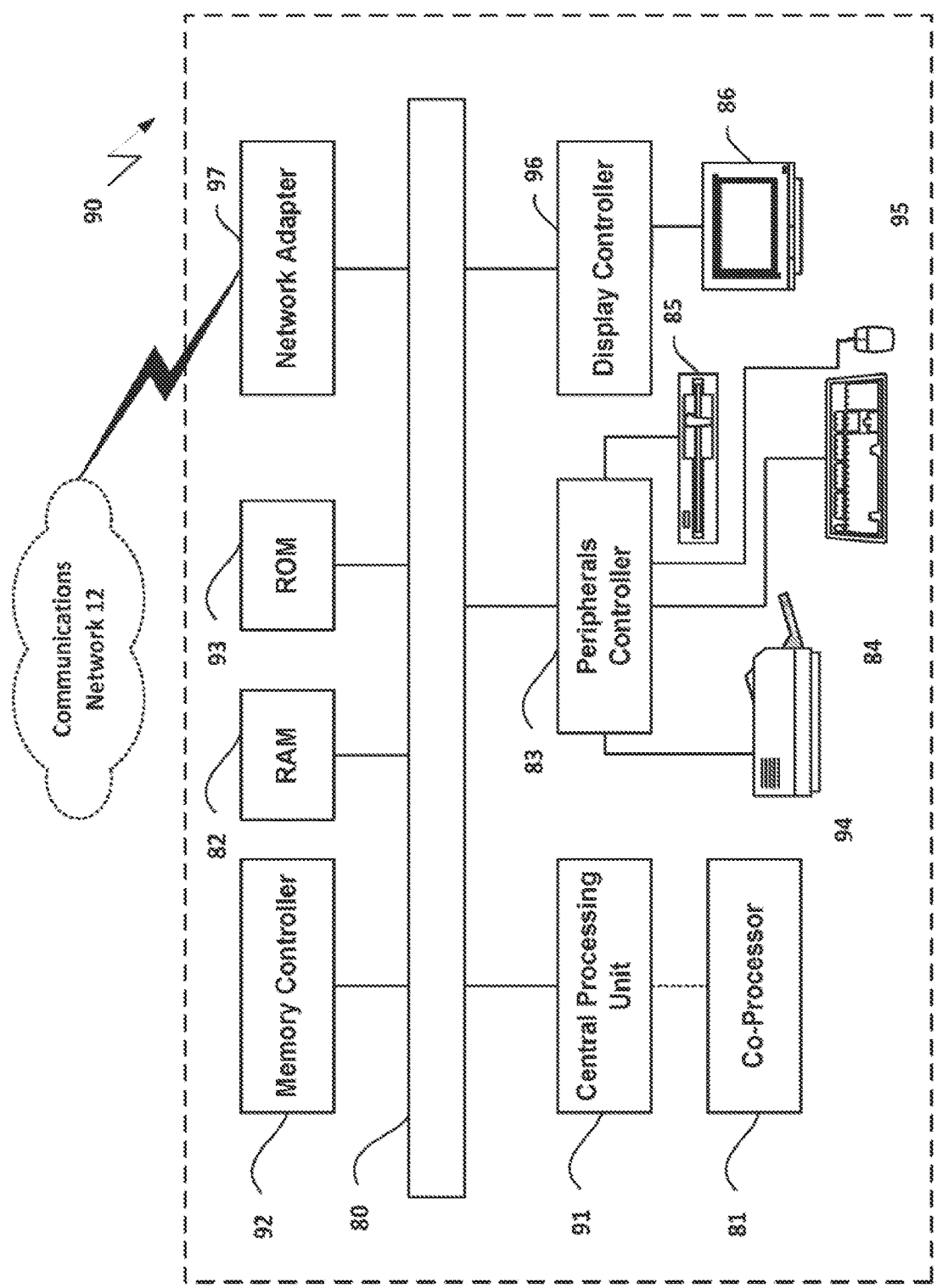
FIG. 25 is a block diagram of an example computing system in which a node of the communication system of FIGS. 22 and 23 may be embodied.

FIG. 25 is a block diagram of an exemplary computing system 90 which may also be used to implement one or more nodes of a network, such as the clients, servers, or proxies illustrated in FIGS. 1-14, 15A-15D, 16, 17A-17C, 18A-18B, 19, 20A-20B, and 21-25, which may operate as an M2M server, gateway, device, or other node in an M2M network such as that illustrated in FIGS. 1-14, 15A-15D, 16, 17A-17C, 18A-18B, 19, 20A-20B, 22 and 23

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 1-4, to enable the computing system 90 to communicate with other nodes of the network.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations, or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

We claim:

1. A node of a cellular network, the node comprising a processor and memory storing instructions which, when executed by the processor, cause the node to:
receive, from a wireless transmit/receive unit (WTRU), a first message indicating a request by the WTRU to join a multicast group, wherein the first message comprises an identifier associated with the multicast group and information associated with a protocol data unit (PDU) session to be used to send data associated with the multicast group;
send, to the WTRU, a second message indicating acceptance of the request by the WTRU to join the multicast group; and
send, to a second node of the cellular network, configuration information to cause the second node to be configured for sending, to the WTRU via the PDU session, data associated with the multicast group.

2. The node of claim 1, wherein the information associated with the PDU session comprises at least one of a data network name (DNN) or a single-network slice selection assistance information (S-NSSAI).

3. The node of claim 1, wherein the first message comprises a non-access stratum (NAS) message.

4. The node of claim 1, wherein the first message comprises a request to establish the PDU session.

5. The node of claim 1, wherein the identifier associated with the multicast group comprises a temporary mobile group identity (TMGI).

6. The node of claim 1, wherein the second message comprises information indicative of at least one of a service area associated with the multicast group or a schedule associated with the multicast group, and wherein the information indicative of the schedule indicates when data associated with the multicast group will be sent by the cellular network and wherein the information indicative of the service area indicates where in the cellular network the data associated with the multicast group will be sent.

7. The node of claim 6, wherein the information indicative of the schedule comprises an indication of a start time associated with sending of data associated with the multicast group.

8. The node of claim 1, wherein the second message comprises one or more security keys associated with sending data of the multicast group.

9. The node of claim 1, wherein the instructions, when executed by the processor, further cause the node to send a third message to a third node, wherein the third message indicates a request to send a paging message to the WTRU indicating that the data associated with the multicast group is available via the PDU session.

10. The node of claim 9, wherein the paging message is configured to trigger the WTRU to execute a procedure to set up network resources that can be used to receive the data.

11. A method, performed by a node of a cellular network, comprising:
receiving, from a wireless transmit/receive unit (WTRU), a first message indicating a request by the WTRU to join a multicast group, wherein the first message comprises an identifier associated with the multicast group and information associated with a protocol data unit (PDU) session to be used to send data associated with the multicast group;
sending, to the WTRU, a second message indicating acceptance of the request by the WTRU to join the multicast group; and
sending, to a second node of the cellular network, configuration information to cause the second node to be configured for sending, to the WTRU via the PDU session, data associated with the multicast group.

12. The method of claim 11, wherein the information associated with the PDU session comprises at least one of a data network name (DNN) or a single-network slice selection assistance information (S-NSSAI).

13. The method of claim 11, wherein the first message comprises a non-access stratum (NAS) message.

14. The method of claim 11, wherein the first message comprises a request to establish the PDU session.

15. The method of claim 11, wherein the identifier associated with the multicast group comprises a temporary mobile group identity (TMGI).

16. The method of claim 11, wherein the second message comprises information indicative of at least one of a service area associated with the multicast group or a schedule associated with the multicast group, and wherein the information indicative of the schedule indicates when data associated with the multicast group will be sent by the cellular network and wherein the information indicative of the service area indicates where in the cellular network the data associated with the multicast group will be sent.

17. The method of claim 16, wherein the information indicative of the schedule comprises an indication of a start time associated with sending of data associated with the multicast group.

18. The method of claim 11, wherein the second message comprises one or more security keys associated with sending data of the multicast group.

19. The method of claim 11, wherein the method further comprises sending a third message to a third node, wherein the third message indicates a request to send a paging message to the WTRU indicating that the data associated with the multicast group is available via the PDU session.

20. The method of claim 19, wherein the paging message is configured to trigger the WTRU to execute a procedure to set up network resources that can be used to receive the data.

* * * * *